(12) United States Patent
Kim et al.

(10) Patent No.: US 11,611,103 B2
(45) Date of Patent: Mar. 21, 2023

(54) SOLID ION CONDUCTOR COMPOUND, SOLID ELECTROLYTE COMPRISING THE SAME, ELECTROCHEMICAL CELL COMPRISING THE SOLID ION CONDUCTOR COMPOUND, AND PREPARATION METHOD THEREOF

(71) Applicant: Samsung Electronics Co., Ltd., Suwon-si (KR)

(72) Inventors: Ryounghee Kim, Uiwang-si (KR); Yan Wang, Burlington, MA (US); Lincoln Miara, Burlington, MA (US); Hyeokjo Gwon, Hwaseong-si (KR); Sewon Kim, Suwon-si (KR); Jusik Kim, Hwaseong-si (KR); Sungkyun Jung, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 318 days.

(21) Appl. No.: 16/914,937

(22) Filed: Jun. 29, 2020

(65) Prior Publication Data
US 2021/0408577 A1    Dec. 30, 2021

(51) Int. Cl.
| | | |
|---|---|---|
| *H01M 10/0562* | (2010.01) | |
| *H01M 4/40* | (2006.01) | |
| *H01M 4/38* | (2006.01) | |
| *H01B 1/08* | (2006.01) | |
| *H01M 4/36* | (2006.01) | |

(Continued)

(52) U.S. Cl.
CPC ...... *H01M 10/0562* (2013.01); *C01G 27/006* (2013.01); *C01G 35/006* (2013.01); *H01B 1/08* (2013.01); *H01M 4/366* (2013.01); *H01M 4/382* (2013.01); *H01M 4/405* (2013.01); *H01M 4/62* (2013.01); *H01M 10/052* (2013.01); *H01M 12/06* (2013.01); *H01M 12/08* (2013.01);

(Continued)

(58) Field of Classification Search
None
See application file for complete search history.

(56) References Cited

U.S. PATENT DOCUMENTS

| | | | |
|---|---|---|---|
| 6,322,928 B1* | 11/2001 | Thackeray | C01G 31/006 252/182.1 |
| 2017/0162903 A1 | 6/2017 | Homma et al. | |
| 2019/0356016 A1 | 11/2019 | Wang et al. | |

FOREIGN PATENT DOCUMENTS

| | | |
|---|---|---|
| EP | 3415467 A1 | 12/2018 |
| KR | 101745930 B1 | 6/2017 |
| KR | 1020190132288 A | 11/2019 |

OTHER PUBLICATIONS

Ki Hyun Kima et al., "Characterization of the interface between LiCoO2 and Li7La3Zr2O12 in an all-solid-state rechargeable lithium battery," Journal of Power Sources, Aug. 1, 2010, pp. 764-767, vol. 196.

Lincoln J. Miara et al., "First-principles studies on cation dopants and electrolyte|cathode interphases for lithium garnets," Chemistry of Materials, Apr. 30, 2015, pp. 1-20, DOI: 10.1021/acs.chemmater. 5b01023.

(Continued)

*Primary Examiner* — Ula C Ruddock
*Assistant Examiner* — Mary Grace Byram
(74) *Attorney, Agent, or Firm* — Cantor Colburn LLP

(57) ABSTRACT

A solid ion conductor compound includes a compound represented by Formula 1:

$$Li_{6-w}Hf_{2-x}M_xO_{7-y}Z_y \qquad \text{Formula 1}$$

where, in Formula 1, M is an element having an oxidation number of a and a is 5, 6, or a combination thereof, Z is an (Continued)

element having an oxidation number of −1, and 0<x<2, 0≤y≤2, and 0<w<6 and w=[(a−4)×x]+y.

28 Claims, 14 Drawing Sheets

(51) Int. Cl.
    *C01G 27/00*     (2006.01)
    *H01M 12/06*     (2006.01)
    *H01M 12/08*     (2006.01)
    *H01M 4/62*     (2006.01)
    *C01G 35/00*     (2006.01)
    *H01M 10/052*     (2010.01)

(52) U.S. Cl.
    CPC ............... *H01M 2300/0025* (2013.01); *H01M 2300/0068* (2013.01); *H01M 2300/0071* (2013.01)

(56) References Cited

OTHER PUBLICATIONS

M. Amores et al., "Synthesis and Ionic Conductivity Studies of In- and Y-Doped Li6Hf2O7 as Solid-State Electrolyte for All-Solid State Li-Ion Batteries," Journal of The Electrochemical Society, Jan. 21, 2017, pp. A6395-A6400, vol. 164, Issue 1.

R. Prasada Raoa et al., "Preparation and mobile ion transport studies of Ta and Nb doped Li6Zr2O7 Li-fast ion conductors," Materials Science and Engineering B, Sep. 20, 2011, pp. 100-105, vol. 177.

Ralf Czekalla et al., "Preparation and Crystal Structure of Li6Zr2O7, and Li6Hf2O7," Zeitschrift für anorganische und allgemeine Chemie, 1993, pp. 2038-2042, vol. 619.

Takehisa Kato et al., "In-situ Li7La3Zr2O12/LiCoO2 interface modification for advanced all-solid-state battery," Journal of Power Sources, Mar. 20, 2014, pp. 292-298, vol. 260.

Youhao Liaoa et al., "Li6Zr2O7 interstitial lithium-ion solid electrolyte," Electrochimica Acta, Apr. 17, 2013, pp. 446-450, vol. 102.

\* cited by examiner

SOLID ION CONDUCTOR COMPOUND, SOLID ELECTROLYTE COMPRISING THE SAME, ELECTROCHEMICAL CELL COMPRISING THE SOLID ION CONDUCTOR COMPOUND, AND PREPARATION METHOD THEREOF

BACKGROUND

1. Field

The present disclosure relates to a solid ion conductor compound, a solid electrolyte including the solid ion conductor compound, a lithium battery including the solid ion conductor compound, and a method of preparing the solid ion conductor compound.

2. Description of Related Art

Much attention has been paid to lithium metal batteries because lithium metal batteries may provide increased specific energy and energy density, and improved power density, in some configurations.

Commercially available solid electrolyte materials are not sufficiently stable against lithium metal. In addition, the lithium ion conductivity of commercially available solid electrolytes is much lower than liquid electrolytes. However, liquid electrolytes, which contain flammable organic solvents, may result in overheating and fire in the event of a short circuit.

A solid electrolyte can avoid reduce the risk of fire or explosion of a flammable organic solvent, even if a short circuit occurs. Accordingly, a lithium ion-battery using a solid electrolyte may significantly increase safety as compared to a lithium-ion battery using a liquid electrolyte. Nonetheless, there remains a need for a material capable of providing high stability against air and/or moisture and improved safety.

SUMMARY

Provided is a solid ion conductor compound having a novel composition.

Provided is a solid electrolyte including the solid ion conductor compound.

Provided is an electrochemical cell including the solid ion conductor compound.

Provided is a method of preparing the solid ion conductor.

Additional aspects will be set forth in part in the description which follows and, in part, will be apparent from the description.

According to an aspect, a solid ion conductor compound represented by Formula 1 is provided:

$$Li_{6-w}Hf_{2-x}M_xO_{7-y}Z_y \quad \text{Formula 1}$$

wherein, in Formula 1,

M is an element having an oxidation number of a, wherein a is 5, 6, or a combination thereof, Z is an element having an oxidation number of −1, and $0<x<2$, $0\leq y\leq 2$, and $0<w<6$, wherein $w=[(a-4)\times x]+y$.

According to an aspect, a solid electrolyte includes the solid ion conductor compound and a binder.

According to an aspect, an electrochemical cell including the solid ion conductor compound includes a positive electrode, a negative electrode, and an electrolyte, wherein at least one of the positive electrode, the negative electrode, or the electrolyte includes the solid ion conductor compound.

According to an aspect, a method of preparing a solid ion conductor compound includes: contacting a lithium compound, a tetravalent cationic element-containing compound, and at least one of a pentavalent cationic element-containing compound or a hexavalent cationic element-containing compound with each other to provide a mixture; and heat-treating the mixture in an oxidizing atmosphere to provide a solid ion conductor compound.

According to an aspect, a solid electrolyte includes: a solid ion conductor compound represented by Formula 1, $$Li_{6-w}Hf_{2-x}M_xO_{7-y}Z_y \quad \text{Formula 1}$$

wherein in Formula 1,

M is an element having an oxidation number of a, wherein a is 5, 6, or a combination thereof, Z is an element having an oxidation number of −1, and $0<x<2$, $0\leq y\leq 2$, and $0<w<6$, wherein $w=[(a-4)\times x]+y$, and a solid ion conductor compound represented by Formula 2, $$Li_{12-n-x}AX_{6-x}Z_x \quad \text{Formula 2}$$

wherein in Formula 2,

A is P, As, Ge, Ga, Sb, Si, Sn, Al, In, Ti, V, Nb, or Ta, and having an oxidation number of n, X is S, Se, or Te, Z is Cl, Br, I, F, CN, OCN, SCN, or $N_3$, and n is 5 or 6, and $0\leq x\leq 2$.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
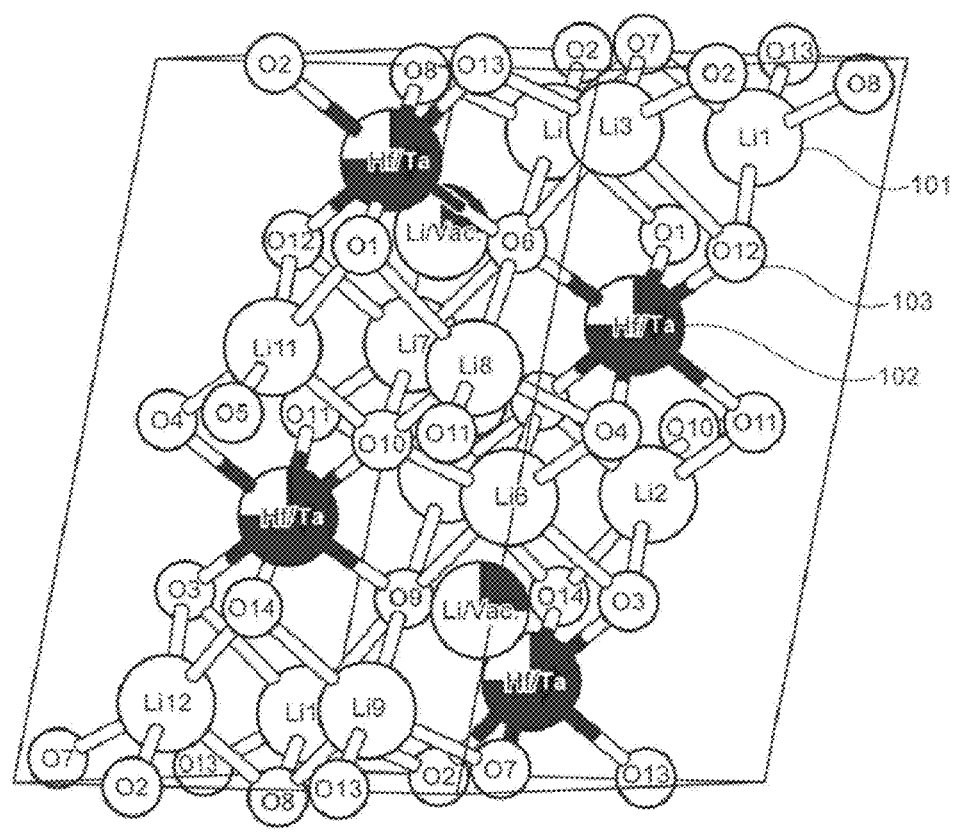
FIG. 1 is a schematic diagram of an embodiment of a $Li_6Hf_2O_7$-type structure with a dopant at an Hf site.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the specification, it will be understood that when one element is referred to as being "on" another element, it may be directly on the other element, or intervening elements may also be present therebetween. On the contrary, when one element is referred to as being "directly on the other element," an intervening element is not present therebetween.

It will be understood that, although the terms "first," "second," "third," etc. may be used herein to describe various components, elements, regions, layers, and/or sections. These components, elements, regions, layers, and/or sections should not be limited by these terms. These terms are only used to distinguish one component, element, region, layer, or section from another. Thus, a first component, element, region, layer, or section may also be referred to as a second component, element, region, layer, or section, without departing from the scope of the present disclosure.

The terms used herein are merely used to describe particular embodiments, and are not intended to limit the present inventive concept. An expression used in the singular encompasses the expression of the plural including "at least one," unless the context clearly indicate otherwise. "At least one" is not to be construed as limiting to "a" or "an." As used herein, the term "and/or" includes any and all combinations of one or more of the associated listed items. As used herein, the terms "including" and/or "having are intended to indicate the existence of features, regions, numbers, operations, components, or elements disclosed in the specification, and are not intended to preclude the possibility that one or more other features, regions, numbers, operations, components, or elements may exist or may be added.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross sectional views that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "Group" refers to a group of elements of the Periodic Table according to the Group 1 to Group 18 classification system of The International Union of Pure and Applied Chemistry ("IUPAC").

In the disclosure, the "size" of a particle represents an average diameter of particles in case of spherical particles, or an average length of main axes in case of non-spherical particles. The average diameter of particles is the median diameter (D50) of particles and is defined by a particle diameter corresponding to accumulated diameter distribution at 50%, which represents the particle diameter of 50% in a sample. The median diameter (D50) of particles may be measured by light scattering using a particle size analyzer (PSA).

Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989. Additional details may be determined by one of skill in the art without undue experimentation.

Electronic conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation.

The term "structure" or "crystal structure" means that the compound is isostructural with the named compound. For example, the term "argyrodite structure" or "argyrodite crystal structure" means that the compound has a structure that is isostructural with argyrodite, $Ag_8GeS_6$.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

Hereinafter, a solid ion conductor compound, a solid electrolyte including the same, an electrochemical cell including the same, and a method of preparing the solid ion conductor compound according to an embodiment will be described in more detail.

Solid Ion Conductor Compound

A solid ion conductor compound according to an embodiment is represented by Formula 1.

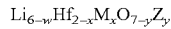
$$Li_{6-w}Hf_{2-x}M_xO_{7-y}Z_y \quad \text{Formula 1}$$

In Formula 1, M is an element having an oxidation number of a and a includes a pentavalent cation, a hexavalent cation, or a combination thereof, Z is an element having an oxidation number of −1, and 0<x<2, 0≤y≤2, and 0<w<6, where w=[(a−4)×x]+y.

Referring to FIG. 1, the solid ion conductor compound represented by Formula 1 has a $Li_6Hf_2O_7$-type structure. As shown in FIG. 1, in the $Li_6Hf_2O_7$-type structure, a lithium atom 101 and a metal atom 102, e.g., Hf, is coordinated by oxygen 103. In FIG. 1, it is understood that a substituent metal or dopant, e.g., $Ta^{5+}$ is located at the site of Hf in this structure. It is understood that a lithium vacancy is introduced into a crystallographic lithium site in the $Li_6Hf_2O_7$ compound doped with $Ta^{5+}$.

Figure 2:
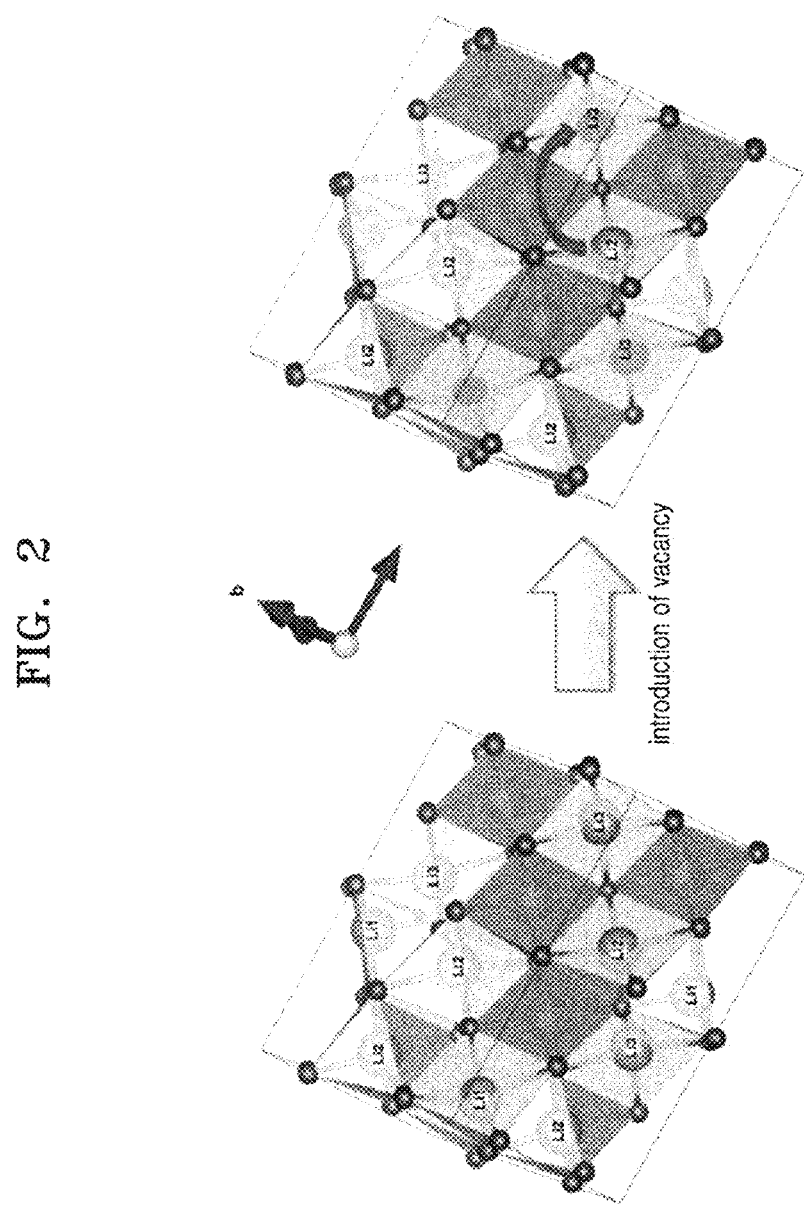
FIG. 2 is a schematic diagram of a doped $Li_6Hf_2O_7$-type structure, according to an embodiment, having a vacancy at an Li site.

It was found that the solid ion conductor compound represented by Formula 1 provides a combination of improved stability against lithium metal and ion conductivity when compared with $Li_6Hf_2O_7$, wherein $Li_6Hf_2O_7$ does not have excellent ion conductivity. Without being limited by theory, it is understood that lithium ion conductivity is improved because a lithium vacancy, for example, a stoichiometric number of lithium ions less than 6, is located at a crystallographic lithium site in $Li_6Hf_2O_7$ and a pentavalent (5+) or hexavalent (6+) atom, i.e., a cation having an atomic value greater than that of $Hf^{4+}$, compensates for the lithium vacancy in the solid ion conductor compound represented by Formula 1. Referring to FIG. 2, when a lithium vacancy is introduced into a crystallographic lithium site, the lithium vacancy may act as a site enabling migration of lithium ions. Thus, an activation energy for migration of lithium ions in the crystal structure decreases, resulting in more efficient migration of lithium ions in the crystal structure.

Also, because oxygen is substituted with an anion having an oxidation number of −1, e.g., a fluorine anion ($F^-$) or a chlorine anion ($Cl^-$), lithium ion conductivity may be enhanced. Without being limited by theory, it is understood that lithium ion conductivity may be improved because the lithium vacancy is introduced by substituting the $Hf^{4+}$ with a cation with a greater oxidation number and using $F^-$ or $Cl^-$.

It is understood that a decrease in lithium content, i.e., an increase in lithium vacancy, may cause a decrease in activation energy, resulting in improvement of lithium ion conductivity, as observed.

In the solid ion conductor compound represented by Formula 1, M may include, for example, a Group 5 element, a Group 15 element, or a combination thereof. M may be, for example, Ta, Nb, V, Sb, As, or a combination thereof. M may be, for example, $Ta^{5+}$, $Nb^{5+}$, $V^{5+}$, $Sb^{5+}$, $As^{5+}$, or a combination thereof.

In solid ion conductor compound represented by Formula 1, M may include, for example, a Group 6 element, a Group 16 element, or a combination thereof. M may be, for example, W, Se, Te, Mo, or a combination thereof. M may be, for example, $W^{6+}$, $Se^{6+}$, $Te^{6+}$, $Mo^{6+}$, or a combination thereof.

In the solid ion conductor compound represented by Formula 1, Z may be, for example, F, Cl, Br, I, or a combination thereof.

In the solid ion conductor compound represented by Formula 1, for example, 0<x≤1.75, 0<x≤1.5, 0<x≤1.25, 0<x≤1.0, 0<x≤0.75, 0<x≤0.5, or 0<x≤0.25.

In the solid ion conductor compound represented by Formula 1, for example, 0<y≤1.75, 0<y≤1.5, 0<y≤1.25, 0<y≤1.0, 0<y≤0.75, 0<y≤0.5, or 0<y≤0.25.

In the solid ion conductor compound represented by Formula 1, for example, 0<w≤5.5, 0<w≤5.0, 0<w≤4.5, 0<w≤4.0, 0<w≤3.5, 0<w≤3.0, 0<w≤2.5, 0<w≤2.0, 0<w≤1.5, 0<w≤1.0, or 0<w≤0.75.

In an aspect, M in Formula 1 is Ta, Nb, V, Sb, or As. The solid ion conductor compound represented by Formula 1 may be represented by, for example, Formulae 2a to 2e.

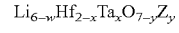
$$Li_{6-w}Hf_{2-x}Ta_xO_{7-y}Z_y \quad \text{Formula 2a}$$

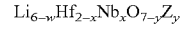
$$Li_{6-w}Hf_{2-x}Nb_xO_{7-y}Z_y \quad \text{Formula 2b}$$

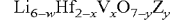
$$Li_{6-w}Hf_{2-x}V_xO_{7-y}Z_y \quad \text{Formula 2c}$$

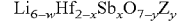
$$Li_{6-w}Hf_{2-x}Sb_xO_{7-y}Z_y \quad \text{Formula 2d}$$

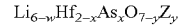
$$Li_{6-w}Hf_{2-x}As_xO_{7-y}Z_y \quad \text{Formula 2e}$$

In formulae 2a to 2e, Z is $F^-$, $Cl^-$, $Br^-$, $I^-$ or a combination thereof, 0<x≤0.25, 0≤y≤0.25, and 0<w≤0.5.

In an aspect, M in Formula 1 is W, V, Se, Te, or Mo. The solid ion conductor compound represented by Formula 1 may be represented by, for example, Formulae 2f to 2j.

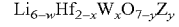
$$Li_{6-w}Hf_{2-x}W_xO_{7-y}Z_y \quad \text{Formula 2f}$$

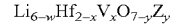
$$Li_{6-w}Hf_{2-x}V_xO_{7-y}Z_y \quad \text{Formula 2g}$$

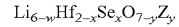
$$Li_{6-w}Hf_{2-x}Se_xO_{7-y}Z_y \quad \text{Formula 2h}$$

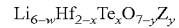
$$Li_{6-w}Hf_{2-x}Te_xO_{7-y}Z_y \quad \text{Formula 2i}$$

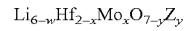
$$Li_{6-w}Hf_{2-x}Mo_xO_{7-y}Z_y \quad \text{Formula 2j}$$

In formulae 2f to 2j, Z is $F^-$, $Cl^-$, $Br^-$, $I^-$ or a combination thereof, 0<x≤0.25, 0≤y≤0.25, and 0<w≤0.75.

The solid ion conductor compound represented by Formula 1 may be, for example, $Li_{5.875}Hf_{1.875}Ta_{0.125}O_7$, $Li_{5.75}Hf_{1.75}Ta_{0.25}O_7$, $Li_{5.75}Hf_{1.875}Ta_{0.125}O_{6.875}F_{0.125}$, $Li_{5.75}Hf_{1.875}Ta_{0.125}O_{6.875}Cl_{0.125}$, $Li_{5.75}Hf_{1.875}Ta_{0.125}O_{6.875}Br_{0.125}$, $Li_{5.75}Hf_{1.875}Ta_{0.125}O_{6.875}I_{0.125}$, $Li_{5.875}Hf_{1.875}Nb_{0.125}O_7$, $Li_{5.75}Hf_{1.75}Nb_{0.25}O_7$, $Li_{5.75}Hf_{1.875}Nb_{0.125}O_{6.875}F_{0.125}$, $Li_{5.75}Hf_{1.875}Nb_{0.125}O_{6.875}Cl_{0.125}$, $Li_{5.75}Hf_{1.875}Nb_{0.125}O_{6.875}Br_{0.125}$, $Li_{5.75}Hf_{1.875}Nb_{0.125}O_{6.875}I_{0.125}$, $Li_{5.875}Hf_{1.875}V_{0.125}O_7$, $Li_{5.75}Hf_{1.75}V_{0.25}O_7$, $Li_{5.75}Hf_{1.875}V_{0.125}O_{6.875}F_{0.125}$, $Li_{5.75}Hf_{1.875}V_{0.125}O_{6.875}Cl_{0.125}$, $Li_{5.75}Hf_{1.875}V_{0.125}O_{6.875}Br_{0.125}$, $Li_{5.75}Hf_{1.875}V_{0.125}O_{6.875}I_{0.125}$, $Li_{5.875}Hf_{1.875}Sb_{0.125}O_7$, $Li_{5.75}Hf_{1.75}Sb_{0.25}O_7$, $Li_{5.75}Hf_{1.875}Sb_{0.125}O_{6.875}F_{0.125}$, $Li_{5.75}Hf_{1.875}Sb_{0.125}O_{6.875}Cl_{0.125}$, $Li_{5.75}Hf_{1.875}Sb_{0.125}O_{6.875}Br_{0.125}$, $Li_{5.75}Hf_{1.875}Sb_{0.125}O_{6.875}I_{0.125}$, $Li_{5.875}Hf_{1.875}As_{0.125}O_7$, $Li_{5.75}Hf_{1.75}As_{0.25}O_7$, $Li_{5.75}Hf_{1.875}As_{0.125}O_{6.875}F_{0.125}$, $Li_{5.75}Hf_{1.875}As_{0.125}O_{6.875}Cl_{0.125}$, $Li_{5.75}Hf_{1.875}As_{0.125}O_{6.875}Br_{0.125}$, $Li_{5.75}Hf_{1.875}As_{0.125}O_{6.875}I_{0.125}$, $Li_{5.75}Hf_{1.875}W_{0.125}O_7$, $Li_{5.50}Hf_{1.75}W_{0.25}O_7$, $Li_{5.625}Hf_{1.875}W_{0.125}O_{6.875}F_{0.125}$, $Li_{5.625}Hf_{1.875}W_{0.125}O_{6.875}Cl_{0.125}$, $Li_{5.625}Hf_{1.875}W_{0.125}O_{6.875}Br_{0.125}$, $L_{5.625}Hf_{1.875}W_{0.125}O_{6.875}I_{0.125}$, $Li_{5.75}Hf_{1.875}Se_{0.125}O_7$, $Li_{5.50}Hf_{1.75}Se_{0.25}O_7$, $Li_{5.625}Hf_{1.875}Se_{0.125}O_{6.875}F_{0.125}$, $Li_{5.625}Hf_{1.875}Se_{0.125}O_{6.875}Cl_{0.125}$, $Li_{5.625}Hf_{1.875}Se_{0.125}O_{6.875}Br_{0.125}$, $Li_{5.625}Hf_{1.875}Se_{0.125}O_{6.875}I_{0.125}$, $Li_{5.75}Hf_{1.875}Te_{0.125}O_7$, $Li_{5.50}Hf_{1.75}Te_{0.25}O_7$, $Li_{5.625}Hf_{1.875}Te_{0.125}O_{6.875}F_{0.125}$, $Li_{5.625}Hf_{1.875}Te_{0.125}O_{6.875}Cl_{0.125}$, $Li_{5.625}Hf_{1.875}Te_{0.125}O_{6.875}Br_{0.125}$, $Li_{5.625}Hf_{1.875}Te_{0.125}O_{6.875}I_{0.125}$, $Li_{5.75}Hf_{1.875}Mo_{0.125}O_7$, $Li_{5.50}Hf_{1.75}Mo_{0.25}O_7$, $Li_{5.625}Hf_{1.875}Mo_{0.125}O_{6.875}F_{0.125}$, $Li_{5.625}Hf_{1.875}Mo_{0.125}O_{6.875}Cl_{0.125}$, $Li_{5.625}Hf_{1.875}Mo_{0.125}O_{6.875}Br_{0.125}$, $Li_{5.625}Hf_{1.875}Mo_{0.125}O_{6.875}I_{0.125}$, or a combination thereof.

The solid ion conductor compound represented by Formula 1 provides improved lithium ion conductivity. The solid ion conductor compound represented by Formula 1 provides an ion conductivity of about $1\times10^{-3}$ millisiemens per centimeter (mS/cm) or more, about $2\times10^{-3}$ mS/cm or more, about $3\times10^{-3}$ mS/cm or more, about $5\times10^{-3}$ mS/cm or more, about $7\times10^{-3}$ mS/cm or more, about $9\times10^{-3}$ mS/cm or more, or about $10\times10^{-3}$ mS/cm or more at room temperature, e.g., at 300 (kelvin) K, at 27° C. The solid ion conductor compound represented by Formula 1 may have an ionic conductivity of about $1\times10^{-3}$ mS/cm to about $1\times10^{1}$ mS/cm, about $2\times10^{-3}$ mS/cm to about $1\times10^{1}$ mS/cm, about $2\times10^{-3}$ mS/cm to about 5 mS/cm, about $4\times10^{-3}$ mS/cm to about 5 mS/cm, about $4\times10^{-3}$ mS/cm to about 1 mS/cm, about $5\times10^{-3}$ mS/cm to about 1 mS/cm, about $1\times10^{-2}$ mS/cm to about 1 mS/cm, about $2\times10^{-2}$ mS/cm to about 1 mS/cm, about $4\times10^{-2}$ mS/cm to about 1 mS/cm, about $5\times10^{-2}$ mS/cm to about 1 mS/cm, about $1\times10^{-1}$ mS/cm to about 1 mS/cm, about $2\times10^{-1}$ mS/cm to about 1 mS/cm, about $2\times10^{-1}$ mS/cm to about $5\times10^{-1}$ mS/cm, or about $2\times10^{-1}$ mS/cm, at 27° C.

The solid ion conductor compound represented by Formula 1 provides a reduced electron conductivity. The solid ion conductor compound represented by Formula 1 provides an electron conductivity of about $1\times10^{-5}$ mS/cm or less, about $0.5\times10^{-5}$ mS/cm or less, about $0.3\times10^{-5}$ mS/cm or less, about $0.2\times10^{-5}$ mS/cm or less, about $0.1\times10^{-5}$ mS/cm or less, about $0.05\times10^{-5}$ mS/cm or less, or about $0.01\times10^{-5}$ mS/cm or less at room temperature, e.g., at 300 K, at 27° C. The solid ion conductor compound represented by Formula 1 may have an electron conductivity of 0 mS/cm to about $1\times10^{-5}$ mS/cm, about $1\times10^{-8}$ mS/cm to about $1\times10^{-5}$ mS/cm, about $2.0\times10^{-8}$ mS/cm to about $5\times10^{-6}$ mS/cm, about $1\times10^{-7}$ mS/cm to about $3\times10^{-6}$ mS/cm, about $2\times10^{-7}$ mS/cm to about $2\times10^{-6}$ mS/cm, about $5\times10^{-7}$ mS/cm to about $2\times10^{-6}$ mS/cm. Thus, in an electrode assembly including: a positive electrode; negative electrode; and a solid ion conductor compound represented by Formula 1 disposed between the positive electrode and the negative electrode, the possibility of a short circuit may be reduced between the positive electrode and the negative electrode by effectively blocking transfer of electrons between the positive electrode and the negative electrode.

In the solid ion conductor compound represented by Formula 1, an Li/O ratio that is a molar ratio of lithium atoms and oxygen atoms may be equal to or less than about 0.9, for example, about 0.857. In the solid ion conductor compound represented by Formula 1, the Li/O ratio may be in the range of about 0.5 to about 0.9, about 0.571 to about 0.857, about 0.571 to about 0.85, about 0.571 to about 0.84, about 0.571 to about 0.835, or about 0.571 to about 0.83. When the solid ion conductor compound represented by Formula 1 has a Li/O ratio in these ranges, a vacancy is introduced into the crystallographic lithium site, resulting in improved lithium ion conductivity.

The solid ion conductor compound represented by Formula 1 may have, for example, a monoclinic crystal structure and belong to a C2/c space group. In addition, the solid ion conductor compound represented by Formula 1 may be a rock-salt-type oxide having a rock-salt-type crystal structure. In addition, in the solid ion conductor compound represented by Formula 1, a unit cell of the rock-salt-type crystal structure may have an ordered oxygen deficiency, and each of the lithium atoms may be coordinated by 5 oxygen atoms in a square pyramid form, and at least one atom of Hf and M may be coordinated by 6 oxygen atoms in an octahedral form in the unit cell of the rock-salt-type crystal structure. In an aspect, the solid ion conductor compound represented by Formula 1 may have a distorted rock salt crystal structure. Due to the distorted rock salt crystal structure and substitution with at least one of the $M^{5+}$ cationic element or the $M^{6+}$ cationic element, the solid ion conductor compound may provide both improved lithium ion conductivity and electrochemical stability against lithium metal.

The solid ion conductor compound represented by Formula 1 may have an energy above hull of about 50 millielectron volts per atom (meV/atom) or less (e.g., greater than 0), about 40 meV/atom or less, about 30 meV/atom or less, about 25 meV/atom or less, or about 20 meV/atom or less. Due to such a low energy above hull, the solid ion conductor compound represented by Formula 1 may have improved phase stability.

Solid Electrolyte

A solid electrolyte according to another embodiment may include the solid ion conductor compound represented by Formula 1. The solid electrolyte may have high ion conductivity, low electron conductivity, high chemical stability and wide potential window by including the solid ion conductor compound. The solid electrolyte including the solid ion conductor compound represented by Formula 1 may provide improved stability against air or moisture and reduce the possibility of short circuits caused by infiltration of lithium metal through a solid separator. Thus, the solid electrolyte may be used as, for example, an electrolyte of an electrochemical cell.

The solid electrolyte may further include a commercially available solid ion conductor compound in addition to the solid ion conductor compound represented by Formula 1. For example, the solid electrolyte may further include a sulfide-based solid electrolyte and/or an oxide-based solid electrolyte. The commercially available solid ion conductor compound additionally added may be, for example, $Li_3N$, a lithium super ionic conductor (LISICON), $Li_{3-y}PO_{4-x}N_x$, where $0<y<3$, $0<x<4$ (LIPON), $Li_{3.25}Ge_{0.25}P_{0.75}S_4$ (thio-LISICON), $Li_2S$, $Li_2S\text{—}P_2S_5$, $Li_2S\text{—}SiS_2$, $Li_2S\text{—}GeS_2$, Li$_2$S—B$_2$S$_5$, Li$_2$S—Al$_2$S$_5$, Li$_2$O—Al$_2$O$_3$—TiO$_2$—P$_2$O$_5$ (LATP), or a crystalline argyrodite-type solid ion conductor, but is not limited thereto, and any suitable solid ion conductor may be used.

The crystalline argyrodite-type solid ion conductor may be, for example, a solid ion conductor represented by Formula 2 and having crystallinity. The crystalline argyrodite-type solid ion conductor is obtained by a high temperature heat-treatment performed at a temperature of about 550° C. or higher.

$$\text{Li}_{12-n-x}\text{AX}_{6-x}\text{Z}_x \qquad \text{Formula 2}$$

In Formula 2, A is P, As, Ge, Ga, Sb, Si, Sn, Al, In, Ti, V, Nb, or Ta, X is S, Se, or Te, Y is Cl, Br, I, F, CN, OCN, SCN, or N$_3$, and A has an oxidation state n of 5 or 6, and $0 \le x \le 2$.

The argyrodite-type solid ion conductor may comprise Li$_{7-x}$PS$_{6-x}$Cl$_x$ (where $0 \le x \le 2$), Li$_{7-x}$PS$_{6-x}$Br$_x$ (where $0 \le x \le 2$), or Li$_{7-x}$PS$_{6-x}$I$_x$ (where $0 \le x \le 2$). Particularly, the argyrodite-type solid ion conductor includes Li$_6$PS$_5$Cl, Li$_6$PS$_5$Br, Li$_6$PS$_5$I, or a combination thereof. The crystalline argyrodite-type solid ion conductor may have a Young's modulus of, for example, about 30 GPa or more.

The solid electrolyte may be in the form of a powder or a molded product. The solid electrolyte in the form of a molded product, may be in the form of a pellet, a sheet, a thin film, or the like, without being limited thereto and may also have various forms according to the intended use.

The solid electrolyte may further include an additional phase in addition to the solid ion conductor compound represented by Formula 1. The additional phase may be generated during a process of manufacturing the solid ion conductor compound.

The solid electrolyte may include, for example, Li$_a$M$_b$O$_c$ (where $1.0 \le a \le 4.0$, $0.5 \le b \le 1.5$, $2.0 \le c \le 5.0$, and M is Ta, Nb, V, Sb, As, W, Se, Te, or Mo), Li$_a$Hf$_b$O$_c$ (where $5.0 \le a \le 7.0$, $1.5 \le b \le 2.5$, and $6.0 \le c \le 8.0$), La$_d$Hf$_e$O$_f$ ($7.5 \le d \le 8.5$, $0.5 \le e \le 1.5$, and $5.5 \le f \le 6.5$), La$_h$Hf$_i$O$_j$ ($1.5 \le h \le 2.5$, $0.5 \le i \le 1.5$, and $2.5 \le j \le 3.5$), Li$_2$O, LiF, LiCl, LiBr, LiI, or combination thereof. The solid electrolyte may an additional phase, e.g., Li$_6$Hf$_2$O$_7$, Li$_2$HfO$_3$, Li$_3$TaO$_4$, Li$_3$NbO$_4$, Li$_3$VO$_4$, Li$_3$SbO$_4$, Li$_3$AsO$_4$, Li$_2$O, or a combination thereof.

Electrochemical Cell

An electrochemical cell according to an embodiment comprises a positive electrode; a negative electrode; and an electrolyte disposed between the positive electrode and the negative electrode, wherein at least one of the positive electrode, the negative electrode or the electrolyte includes the solid ion conductor compound represented by Formula 1.

Because the electrochemical cell includes the solid ion conductor compound represented by Formula 1, the electrochemical cell may have improved lithium ion conductivity and stability against lithium metal.

For example, at least one of the positive electrode, the negative electrode, or the electrolyte included in the electrochemical cell may include the solid ion conductor compound represented by Formula 1.

For example, a protective layer including the solid ion conductor compound represented by Formula 1 may be arranged on a surface of at least one of the positive electrode, the negative electrode, or the electrolyte.

Because the protective layer including the solid ion conductor compound represented by Formula 1 provides improved lithium ion conductivity and stability against lithium metal, the electrochemical cell may have enhanced capability to protect lithium from water or a component of the electrolyte that may react with lithium.

For example, the protective layer including the solid ion conductor compound represented by Formula 1 may be located on one surface of the negative electrode and the negative electrode may include lithium metal, a lithium metal alloy, or a combination thereof.

Figure 3A:
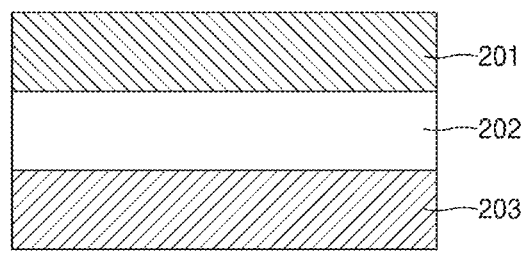
FIG. 3A is a schematic diagram of an embodiment of a protected negative electrode.

Referring to FIG. 3A, the negative electrode may include a layer 201 of a solid ion conductor compound represented by Formula 1 disposed on a lithium or lithium alloy 202. In addition, a current collector 203, e.g., a copper or aluminum foil, may be provided.

For example, the negative electrode may include a lithium particle: including a core containing lithium metal, a lithium metal alloy, or a combination thereof; and a protective shell formed on the core, wherein the protective shell may include the solid ion conductor compound.

Figure 3B:
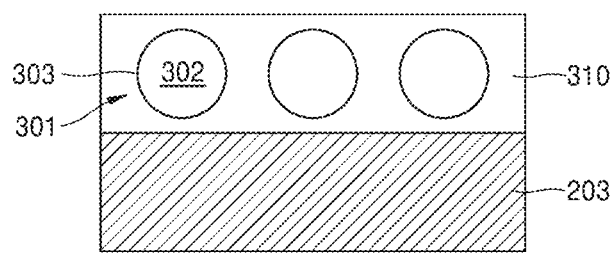
FIG. 3B is a schematic diagram of an embodiment of protected lithium particles.

Referring to FIG. 3B, the lithium metal or lithium metal alloy may be in the form of a particle, and the solid ion conductor compound represented by Formula 1 may be located on a surface of the particle to provide a protected lithium particle 301. The protected lithium particle 301 may have any suitable size, and may have a size of, for example, about 0.1 μm to about 10 μm or about 0.5 μm to about 5 μm. Each protected lithium particle 301 may include a core 302 including lithium or lithium alloy; and a protective shell 303 located on the surface of the core 302, wherein the protective shell 303 may include the solid ion conductor compound represented by Formula 1.

Referring to FIG. 3B, the protected lithium particles 301 may be bound to, for example, a conductive agent and/or a binder to provide a composite negative electrode 310 including the protected lithium particles 301. Referring to FIG. 3B, the composite negative electrode 310 including the protected lithium particle 301 may be located on a current collector 203.

Figure 4A:
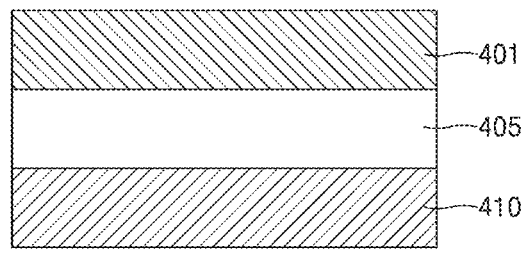
FIG. 4A is a schematic diagram of an electrochemical cell including an embodiment of a solid electrolyte.

Referring to FIG. 4A, the electrochemical cell may be prepared by combining a negative electrode 401, e.g., the protected negative electrode, with a positive electrode 410 including a positive active material. A solid electrolyte 405 may be interposed between the positive electrode 410 and the negative electrode 401 for electrical separation the positive electrode 410 and the negative electrode 401 from each other.

The electrochemical cell may be, for example, an all-solid-state lithium battery, a liquid electrolyte-containing lithium battery, or a lithium air battery, but is not limited thereto, and any suitable electrochemical cell may also be used.

Hereinafter, each of the all-solid-state lithium battery, the liquid electrolyte-containing lithium battery, and the lithium air battery will be described in more detail.

All-Solid-State Lithium Battery

The all-solid-state lithium battery may include the solid ion conductor compound represented by Formula 1.

The all-solid-state lithium battery includes a positive electrode, a negative electrode, and a solid electrolyte interposed between the positive electrode and the negative electrode and may further include the solid ion conductor compound represented by Formula 1.

For example, the all-solid-state lithium battery may include a positive electrode, a negative electrode, and a solid electrolyte interposed between the positive electrode and the negative electrode, and a protective layer including the solid ion conductor compound represented by Formula 1 may be located on a surface of at least one of the positive electrode, the negative electrode, and the solid electrolyte. Alternatively, the negative electrode of the all-solid-state lithium battery may include protected lithium particles each including: a core containing lithium metal, a lithium metal alloy, or a combination thereof; and a protective shell located on the core, wherein the protective shell may include the solid ion conductor compound represented by Formula 1.

The all-solid-state lithium battery may be prepared as follows.

First, a solid electrolyte layer is prepared.

The solid electrolyte layer may be prepared by mixing powders of the solid ion conductor compound represented by Formula 1 and/or the sulfide-based solid electrolyte with a binder, and drying the mixture, or by rolling powders of the solid ion conductor compound represented by Formula 1 and/or the sulfide-based solid electrolyte at a pressure of about 1 ton to about 10 tons in a constant shape.

The sulfide-based solid electrolyte may include, for example, lithium sulfide, silicon sulfide, phosphorous sulfide, boron sulfide, or a combination thereof. The sulfide-based solid electrolyte particles may include $Li_2S$, $P_2S_5$, $SiS_2$, $GeS_2$, $B_2S_3$ or a combination thereof. The sulfide-based solid electrolyte particles may be $Li_2S$ or $P_2S_5$. The sulfide-based solid electrolyte particles may have a higher lithium ion conductivity than other inorganic compounds. For example, the sulfide-based solid electrolyte material includes $Li_2S$ and $P_2S_5$. When the sulfide-based solid electrolyte material constituting the solid electrolyte includes $Li_2S$—$P_2S_5$, a mixing ratio of $Li_2S$ to $P_2S_5$ may be in the range of about 50:50 to about 90:10.

In addition, an inorganic solid electrolyte prepared by adding $Li_3PO_4$, a halogen atom, a halogen compound, $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("thio-LISICON"), $Li_2O$—$Al_2O_3$—$TiO_2$—$P_2O_5$ ("LATP"), or an inorganic solid electrolyte such as $Li_2S$—$P_2S_5$, $SiS_2$, $GeS_2$, $B_2S_3$, or a combination thereof may be used as the sulfide-based solid electrolyte. Examples of the sulfide-based solid electrolyte material may include, but are not limited to, $Li_2S$—$P_2S_5$; $Li_2S$—$P_2S_5$—LiX (where X is a halogen element); $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$—$Z_mS_n$ (where m and n are positive numbers, respectively, and Z is Ge, Zn or G); $Li_2S$—$GeS_2$; $Li_2S$—$SiS_2$—$Li_3PO_4$; and $Li_2S$—$SiS_2$—$Li_pMO_q$ (where p and q are positive numbers, respectively, and M is P, Si, Ge, B, Al, Ga or In). In this regard, the sulfide-based solid electrolyte material may be manufactured by treating starting materials (e.g., $Li_2S$ and $P_2S_5$) of the sulfide-based solid electrolyte by a melt quenching method, a mechanical milling method, or other suitable method. Also, a calcination process may further be performed after the above process.

The solid electrolyte may be in the form of particles, for example, may have a spherical or ellipsoidal shape. A diameter of the particles of the solid electrolyte is not particularly limited, but the solid electrolyte may have an average particle diameter in the range of about 0.01 μm to about 30 μm, for example, about 0.1 μm to about 20 μm. The average particle diameter refers to a number average particle diameter (D50) in the distribution of particle diameters obtained by a light scattering method and may be measured by a particle diameter distribution meter. The solid electrolyte may be manufactured by, for example, by a melt quenching method or a mechanical milling method. For example, according to the melt quenching method, $Li_2S$ and $P_2S$ are mixed in a predetermined ratio and the mixture is compressed into pellets. The pellets are reacted at a reaction temperature in a vacuum and quenched to prepare a sulfide-based solid electrolyte material. Also, a reaction temperature of the mixture of $Li_2S$ and $P_2S_5$ may be in the range of about 200° C. to about 800° C., for example, about 300° C. to about 600° C. In addition, a reaction time may be in the range of about 0.1 hours to about 24 hours, for example, about 1 hour to about 12 hours. Furthermore, a temperature during the quenching of a reaction product may be about 10° C. or less, for example, about 0° C. or less, and a quenching rate may be in the range of about 1° C./sec to about 10,000° C./sec, for example, about 1° C./sec to about 1,000° C./sec. In addition, according to the mechanical milling method, the starting materials, e.g., $Li_2S$ and $P_2S_5$, are bound to each other, thereby preparing a sulfide-based solid electrolyte material. In addition, an agitation speed and an agitation time during the mechanical milling method are not particularly limited. However, as the agitation speed increases, a manufacturing rate of the sulfide-based solid electrolyte material increases, and as the agitation time increases, a conversion rate of a raw material into the sulfide-based solid electrolyte material increases. Then, the sulfide-based solid electrolyte material obtained by the melt quenching method or the mechanical milling method is heat-treated at a predetermined temperature and ground to prepare the solid electrolyte in the form of particles.

The obtained solid electrolyte may be deposited by a layer-forming method such as blasting, aerosol deposition, cold spraying, sputtering, chemical vapor deposition (CVD), or spraying, thereby forming a solid electrolyte layer. In addition, the solid electrolyte layer may be formed by pressing the solid electrolyte. In addition, the solid electrolyte layer may be formed by mixing the solid electrolyte, a solvent and a binder or a support, and pressing the mixture. In this case, the solvent or the support may be added to reinforce the strength of the solid electrolyte layer or to prevent short-circuit of the solid electrolyte.

Examples of the binder included in the solid electrolyte layer may include, but are not limited to, styrene butadiene rubber (SBR), polytetrafluoroethylene, polyvinylidene fluoride, polyethylene, and polyvinyl alcohol, and any binder commonly available in the art may also be used. The binder of the solid electrolyte layer may be the same as or different from those of the positive electrode layer and the negative electrode layer.

Subsequently, a positive electrode is prepared.

The positive electrode may be prepared by forming a positive active material layer including a positive active material on a current collector. The positive active material layer may be formed by a vapor phase method or a solid phase method. The vapor phase method may be pulsed laser deposition (PLD), sputtering deposition, chemical vapor deposition, but is not limited thereto, and any suitable method may also be used. The solid phase method may be sintering, sol-gel method, doctor blading, screen printing, slurry casting, or particle pressing, but is not limited thereto, and any suitable method may also be used The positive active material may be any suitable material for use in lithium batteries. For example, the positive active material may be a lithium transition metal oxide or a transition metal sulfide. For example, a composite oxide of lithium and a metal, e.g., cobalt, manganese, nickel, or a combination thereof, may be used, and the compound may be represented by the following formulae: $Li_aA_{1-b}B'_bD_2$ (where $0.90 \le a \le 1.8$ and $0 \le b \le 0.5$); $Li_aE_{1-b}B'_bO_{2-c}D_c$ (where $0.90 \le a \le 1.8$, $0 \le b \le 0.5$, and $0 \le c \le 0.05$); $LiE_{2-b}B'_bO_{4-c}D_c$ (where $0 \le b \le 0.5$ and $0 \le c \le 0.05$); $Li_aNi_{1-b-c}Co_bB'_cD_\alpha$ (where $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_\alpha$ (where $0.90 \le a \le 1.8$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_2$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the formulae above, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. For example, the positive active material may be $LiCoO_2$, $LiMn_xO_{2x}$ (where x=1 or 2), $LiNi_{1-x}Mn_xO_{2x}$ (where $0<x<1$), $Ni_{1-x-y}Co_xMn_yO_2$ (where $0 \leq x \leq 0.5$ or $0 \leq y \leq 0.5$), $LiFePO_4$, $TiS_2$, $FeS_2$, $TiS_3$, or $FeS_3$.

The positive active material layer may further include the solid ion conductor compound represented by Formula 1. The positive active material layer may further include a conductive material or a binder. Any suitable conductive material or any suitable binder may be used. Alternatively, a protective layer including the solid ion conductor compound represented by Formula 1 may be located on the positive active material layer.

Subsequently, a negative electrode is prepared.

The negative electrode may be prepared in the same manner as in the preparation of the positive electrode, except that the negative active material is used instead of the positive active material. The negative electrode may be prepared by forming a negative active material layer including a negative active material on a current collector.

The negative active material layer may further include the solid ion conductor compound represented by Formula 1.

The negative active material may be lithium metal, a lithium metal alloy, or a combination thereof.

The negative active material layer may further include a commercially available negative active material in addition to the lithium metal, the lithium metal alloy, or a combination thereof. The commercially available negative active material may include a metal alloyable with lithium, a transition metal oxide, a non-transition metal oxide, a carbonaceous material, or a combination thereof. The metal alloyable with lithium may include, for example, Si, Sn, Al, Ge, Pb, Bi, Sb, Si—Y' alloy (Y' is an alkali metal, an alkaline earth metal, a Group 13 element, a Group 14 element, a transition metal, a rare earth element, or a combination thereof (except for Si)), Sn—Y' alloy (Y' is an alkali metal, an alkaline earth metal, a Group 13 element, a Group 14 element, a transition metal, a rare earth element, or a combination thereof (except for Sn)). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. For example, the transition metal oxide may include lithium titanium oxide, vanadium oxide, lithium vanadium oxide, or a combination thereof. For example, the non-transition metal oxide may be $SnO_2$ or $SiO_x$ (where $0<x<2$). For example, the carbonaceous material may include crystalline carbon, amorphous carbon, or any mixture thereof. Examples of the crystalline carbon include natural graphite or artificial graphite that are in amorphous, plate, flake, spherical or fibrous form. Examples of the amorphous carbon include soft carbon (carbon sintered at low temperature), hard carbon, mesophase pitch carbides, sintered corks, or a combination thereof.

A protective layer including the solid ion conductor compound represented by Formula 1 may be located on the negative active material layer. Alternatively, the negative active material layer may include protected lithium particles each including: a core containing lithium metal, a lithium alloy, or a combination thereof; a protective shell formed on the core, wherein the protective shell may include the solid ion conductor compound represented by Formula 1, When the protective layer and/or protective shell is located on the negative electrode, the negative electrode may have improved lithium ion conductivity and/or stability against lithium metal.

Figure 4B:
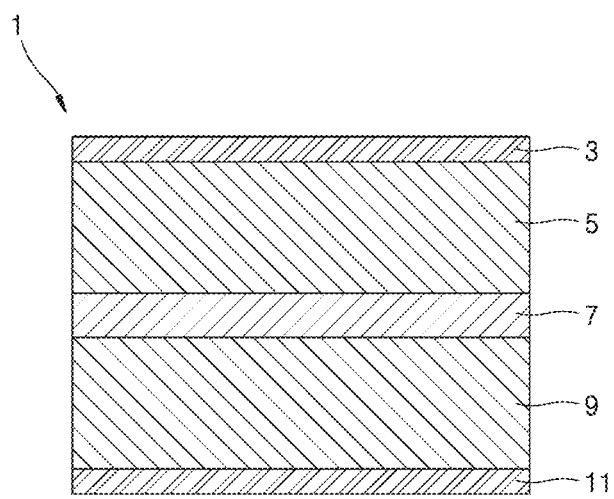
FIG. 4B is a schematic diagram of an all-solid-state lithium battery according to an embodiment.

Referring to FIG. 4B, an all-solid-state lithium battery 40 includes a solid electrolyte layer 30, a positive electrode 10 located on one surface of the solid electrolyte layer 30, and a negative electrode 20 located on the other surface of the solid electrolyte layer 30. The positive electrode 30 includes a positive active material layer 12 in contact with the solid electrolyte layer 30 and a positive current collector 11 in contact with the positive active material layer 12, and the negative electrode 20 may include a negative active material layer 22 in contact with the solid electrolyte layer 30 and a negative current collector 21 in contact with the negative active material layer 22. The all-solid-state lithium battery 40 may be prepared by a vapor phase method or a solid phase method. For example, the all-solid-state lithium battery 1 may be manufactured by forming the positive active material layer 12 and the negative active material layer 22 respectively on both surfaces of the solid electrolyte layer 30 by a vapor phase method, a solid phase method, or a combination thereof, and forming the positive current collector 11 and the negative current collector 21 on the positive active material layer 12 and the negative active material layer 22, respectively. Alternatively, the all-solid-state lithium battery 40 may be manufactured by sequentially stacking the negative active material layer 22, the solid electrolyte layer 30, the positive active material layer 12, and the positive current collector 11, on the negative current collector 21 by a vapor phase method, a solid phase method, or a combination thereof.

Lithium Battery Including Liquid Electrolyte

A liquid electrolyte-containing lithium battery may include the solid ion conductor compound represented by Formula 1.

The liquid electrolyte-containing lithium battery includes: a positive electrode containing a positive active material; a negative electrode containing a negative active material; and a liquid electrolyte, and may further include the solid ion conductor compound represented by Formula 1.

The liquid electrolyte-containing lithium battery may include, for example a positive electrode, a negative electrode, and a liquid electrolyte interposed between the positive electrode and the negative electrode, and a protective layer including the solid ion conductor compound represented by Formula 1 may be located on a surface of at least one of the positive electrode and the negative electrode. Alternatively, the negative electrode of the liquid electrolyte-containing lithium battery may include a lithium particle: including a core containing lithium metal, a lithium metal alloy, or a combination thereof; and a protective shell formed on the core, wherein the protective shell may include the solid ion conductor compound.

The liquid electrolyte-containing lithium battery may be prepared according to an embodiment the following process.

First, a positive electrode is prepared.

A positive active material, a conductive agent, a binder, and a solvent are mixed to prepare a positive active material composition. The positive active material composition may be directly coated on an aluminum current collector and dried to prepare a positive electrode. Alternatively, the positive active material composition may be cast on a separate support, and film separated from the support is laminated on an aluminum current collector to prepare a positive electrode. Alternatively, the positive active material composition may be prepared in an electrode ink form including an excess of a solvent and printed on a support by inkjet printing or gravure printing to prepare a positive electrode. The printing method is not limited to those listed above, and any suitable method used for coating and printing may be used.

The positive active material used in the positive electrode is the same as that of the all-solid-state lithium battery as described above.

The conductive agent may include, for example, carbon black, carbon fiber, and graphite, or a combination thereof. The carbon black may be, for example, acetylene black, ketjen black, super-P carbon, channel black, furnace black, lamp black, thermal black, or a combination thereof. The graphite may be natural graphite or artificial graphite. A combination including at least one of these may be used. The positive electrode may further include an additional conductive agent in addition to the carbonaceous conductive agent. The additional conductive agent may be: a conductive fiber such as metal fiber; a carbon powder such as hydrofluorocarbon powder, a metal powder such as aluminum powder, or a nickel powder; a conductive whisker such as zinc oxide or potassium titanate; or a polyphenylene derivative. A combination of at least one of the additional conductive agents listed above may be used. An amount of the conductive agent may be in the range of about 1 part by weight to about 10 parts by weight, for example, about 2 parts by weight to about 7 parts by weight, based on a total weight of the positive active material. When the amount of the conductive agent is within the range above, e.g., in the range of about 1 part by weight to about 10 parts by weight, the positive electrode may have an acceptable electrical conductivity.

The binder may increase adhesion between components of the positive electrode, and adhesion of the positive electrode to the current collector may increase. Example of the binder may include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, fluoride rubber, and various copolymers, or a combination thereof. An amount of the binder may be in the range of about 1 part by weight to about 10 parts by weight, for example, about 2 parts by weight to about 7 parts by weight, based on the total weight of the positive active material. When the amount of the binder is within the range above, e.g., in the range of about 1 part by weight to about 10 parts by weight, adhesion of the negative electrode to the current collector may increase.

The solvent may be N-methylpyrrolidone, acetone, water, or a combination thereof. The positive active material, the conductive agent, the binder, and the solvent may be used in an amount suitable for a lithium battery.

The positive active material composition may further include the solid ion conductor compound represented by Formula 1. Alternatively, a protective layer including the solid ion conductor compound represented by Formula 1 may be located on the positive active material layer obtained by coating the positive active material composition on the current collector and drying the composition.

Subsequently, a negative electrode is prepared.

In the same manner as in the preparation of the positive electrode described above, a negative active material, a conductive agent, a binder, and a solvent are mixed to prepare a negative active material composition. The negative active material composition may be directly coated on a copper current collector and dried to prepare a negative electrode. Alternatively, the negative active material composition may be cast on a separate support, and film separated from the support is laminated on a copper current collector to prepare a negative electrode. Alternatively, the negative active material composition may be prepared in an electrode ink form including an excess of a solvent and printed on a support by inkjet printing or gravure printing to prepare a negative electrode. The printing method is not limited to those listed above, and any suitable method for coating and printing may be used.

The negative active material used in the negative electrode is the same as that of the all-solid-state lithium battery as described above. The conductive agent, the binder, and the solvent used in the preparation of the negative electrode may be the same as those used in preparation of a positive electrode plate. The negative active material, the conductive agent, the binder, and the solvent may be used in a suitable amount for a lithium battery. A plasticizer may further be added to the positive active material composition and/or the negative active material composition to form pores inside electrode plates.

A protective layer including the solid electrolyte compound represented by Formula 1 may be located on the negative active material layer. Alternatively, the negative active material layer may include a lithium particle: including a core containing lithium metal, a lithium metal alloy, or a combination, and a protective shell formed on the core, wherein the protective shell may include the solid ion conductor compound. The protective layer and/or protective shell is located in the negative electrode, the negative electrode may have improved lithium ion conductivity and/or stability against lithium metal.

Subsequently, a separator is prepared.

The positive electrode may be separated from the negative electrode by a separator. Any suitable separator may be used. Any separator having low resistance against migration of ions in the electrolyte and excellent electrolyte-retaining ability may be used. For example, glass fiber, polyester, Teflon, polyethylene, polypropylene, polytetrafluoroethylene (PTFE), or a combination thereof, each of which may be a non-woven or woven fabric may be used. More specifically, a windable separator including polyethylene, polypropylene, or a combination thereof, may be used in lithium-ion batteries and a separator having excellent electrolyte-retaining capability may be used in lithium-ion polymer batteries.

The separator may be prepared according to the following process. A polymer resin, a filler, and a solvent are mixed to prepare a separator composition. The separator composition may directly be coated on an electrode and dried to form a separator. Alternatively, the separator composition may be cast on a support and dried, and a separator film separated from the support may be laminated on an electrode to prepare a separator. The polymer resin used to prepare the separator is not particularly limited and may be any material commonly used as a binder for electrode plates. For example, a vinylidenefluoride/hexafluoropropylene copolymer, polyvinylidene fluoride (PVDF), polyacrylonitrile, polymethylmethacrylate, or any mixture thereof may be used. A vinylidenefluoride/hexafluoropropylene copolymer having a hexafluoropropylene content of about 8 wt % to about 25 wt %.

Subsequently, a liquid electrolyte is prepared.

The liquid electrolyte is an organic electrolytic solution including an organic solvent. The liquid electrolyte may be prepared by dissolving a lithium salt in an organic solvent. Any suitable organic solvent may be used. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, or a combination thereof. The lithium salt may be any lithium salt suitable for use in lithium batteries. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are different and each independently an integer of 1 to 20), LiCl, LiI, or a combination thereof. The amount of the lithium salt may be in the range of about 0.01 M to about 2.0 M, but is not limited thereto, and may be selected within a range providing improved battery performance.

The liquid electrolyte may further include a flame retardant such as a phosphate-based flame retardant and a halogen-based flame retardant.

Figure 4C:
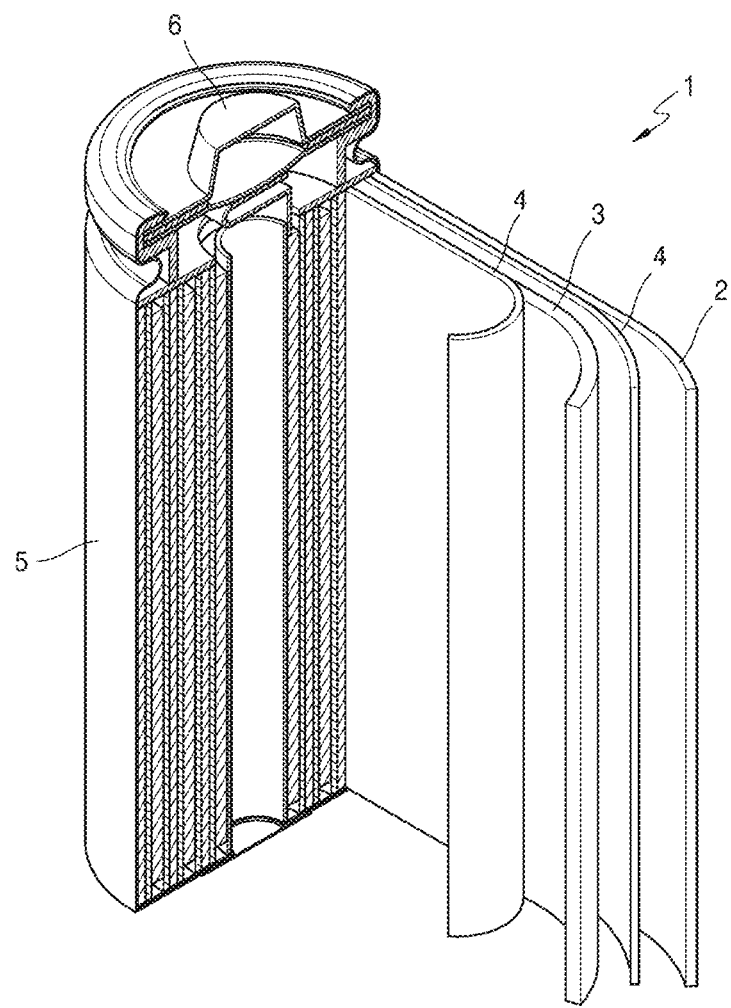
FIG. 4C is a schematic diagram of an embodiment of a liquid electrolyte-containing lithium battery.

As shown in FIG. 4C, a liquid electrolyte-containing lithium battery 1 includes a positive electrode 3, a negative electrode 2, and a separator 4. The positive electrode 3, the negative electrode 2, and the separator 4 may be wound or folded, and then accommodated in a battery case 5. Then, an organic electrolytic solution is injected into the battery case 5 and the battery case 5 is sealed by a cap assembly 6, thereby completing the lithium battery 1. The battery case 5 may have a cylindrical shape, a rectangular shape, or a thin-film shape. The liquid electrolyte-containing lithium battery may be, for example, a large-sized thin film type battery. The separator 4 is interposed between the positive electrode 3 and the negative electrode 2 to form a battery assembly. The battery assembly may be stacked in a bi-cell structure and impregnated with the organic electrolytic solution. The resultant is put into a pouch and sealed, thereby completing the manufacture of a lithium ion polymer battery. A plurality of battery assemblies may be stacked to form a battery pack, which may be used in any device that requires high capacity and high output. The battery pack may be used, for example, in laptop computers, smartphones, or electric vehicles. The liquid electrolyte-containing lithium battery may also be used for electric vehicles (EVs) due to excellent thermal stability and high-rate and high rate capability. For example, the liquid electrolyte-containing lithium battery may be applied to hybrid electric vehicles such as plug-in hybrid electric vehicles (PHEVs). Also, the liquid electrolyte-containing lithium battery may be used electricity storage systems (ESSs) that require a large amount of electric energy.

Lithium Air Battery

A lithium air battery may include the solid ion conductor compound represented by Formula 1.

The lithium air battery includes a positive electrode using air as a positive active material, a negative electrode, and an electrolyte, and may further include the solid ion conductor compound represented by Formula 1.

The lithium air battery includes a positive electrode, a negative electrode, and an electrolyte interposed between the positive electrode and the negative electrode, and a protective layer including the solid ion conductor compound represented by Formula 1 may be located on a surface of at least one of the positive electrode, the negative electrode, or the electrolyte. Alternatively, the negative electrode of the lithium air battery may include, for example, a lithium particle: including a core containing lithium metal, a lithium metal alloy, or a combination thereof, and a protective shell formed on the core, wherein the protective shell may include the solid ion conductor compound.

For example, the lithium air battery may be prepared according to the following process.

First, a positive electrode is prepared.

A positive electrode slurry is prepared by mixing a conductive material, a catalyst for oxidation/reduction of oxygen, and a binder, and adding a solvent to the mixture. The positive electrode slurry is coated on a surface of a substrate and dried or press-molded on the substrate to increase a density of the electrode. The substrate is, for example, a positive current collector, a separator, or a solid electrolyte film. The positive current collector is, for example, a gas diffusion layer. In the positive electrode, the catalyst for oxidation/reduction of oxygen and the binder may be omitted according to desired types of the positive electrode.

The conductive material is, for example, porous. Since the conductive material is porous, air easily penetrates thereinto. Any conductive materials having porosity and/or conductivity may be used. For example, porous carbonaceous materials may be used. Examples of the carbonaceous material include, but are not limited to, carbon black, graphite, graphene, activated carbon, and carbon fiber, or any other suitable carbonaceous materials may be used. The conductive material is, for example, a metallic material. The metallic material is, for example, metal fiber, metal mesh, or metal powder. For example, a metal powder comprising copper, silver, nickel, aluminum, or a combination thereof. The conductive material is, for example, an organic conductive material. For example, the organic conductive material is a polyphenylene derivative, a polythiophene derivative, or a combination thereof. The conductive materials may be used alone or in a mixture.

Examples of the catalyst for oxidation/reduction of oxygen include, but are not limited to, a noble metal catalyst such as platinum, gold, silver, palladium, ruthenium, rhodium, or osmium, an oxide catalyst such as manganese oxide, iron oxide, cobalt oxide, or nickel oxide, or an organometallic catalyst such as cobalt phthalocyanine, or any other suitable catalysts for oxidation/reduction of oxygen. The catalyst for oxidation/reduction of oxygen may be omitted.

The catalyst may be supported, for example, on a support. Examples of the support include an oxide support, a zeolite support, a clay-based mineral support, or a carbon support. The oxide support may comprise alumina, silica, zirconium oxide, titanium dioxide, or a combination thereof. The oxide support may be a metal oxide comprising Ce, Pr, Sm, Eu, Tb, Tm, Yb, Sb, Bi, V, Cr, Mn, Fe, Co, Ni, Cu, Nb, Mo W, or a combination thereof. Examples of the carbon support include, but are not limited to, carbon black such as ketjen black, acetylene black, channel black, or lamp black, graphite such as natural graphite, artificial graphite, or expanded graphite, activated carbon, carbon fiber, or any suitable support. A combination comprising at least one of the foregoing may be used.

The binder may include a thermoplastic resin or a thermoset resin. Examples of the binder may include polyethylene, polypropylene, polytetrafluorethylene (PTFE), polyvinylidene difluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, or an ethylene-acrylic acid copolymer, each of which may be used alone or in combination with each other, without being limited thereto. Any suitable binder may also be used. The binder may be omitted.

A porous body having a network structure or mesh structure may be used as the positive current collector to facilitate diffusion of oxygen. A porous metal plate that is made of stainless steel, nickel, or aluminum may be used, without being limited thereto. Any suitable material may be used as a current collector. The positive current collector may be coated with an oxidation resistant metal or an alloy coating film to prevent oxidation.

The positive electrode may further include the solid ion conductor compound represented by Formula 1. Alternatively, a protective layer including the solid ion conductor compound represented by Formula 1 may be located on the positive electrode.

Subsequently, a negative electrode is prepared.

The negative electrode is prepared by forming a negative active material layer including a negative active material on a negative current collector.

The negative active material may be lithium metal, a lithium metal alloy, or any combination thereof.

The negative active material may be, for example, a lithium metal thin film or a lithium-based alloy thin film. The lithium-based alloy may be an alloy of lithium with a metal such as aluminum, tin, magnesium, indium, calcium, titanium, or vanadium.

A protective layer including the solid electrolyte compound represented by Formula 1 may be formed on the negative active material layer. Alternatively, the negative active material layer may include protected lithium particles each including: a core containing lithium metal, a lithium metal alloy, or a combination thereof, and a protective shell formed on the core, wherein the protective shell may include the solid ion conductor compound. When the protective layer and/or protective shell is located in the negative electrode, the negative electrode may have improved lithium ion conductivity and/or stability against lithium metal.

Subsequently, an electrolyte layer interposed between the positive electrode and the negative electrode is prepared.

The electrolyte layer includes at least one of a solid electrolyte, a gel electrolyte, or a liquid electrolyte. The solid electrolyte, the gel electrolyte, and the liquid electrolyte are not particularly limited and may be any suitable electrolyte. For example, the electrolyte layer may include the solid ion conductor compound represented by Formula 1.

The solid electrolyte may include at least one of a solid electrolyte including an ion-conductive inorganic material, a solid electrolyte including a polymeric ionic liquid (PIL) and a lithium salt, a solid electrolyte including an ionically conducting polymer and a lithium salt, or a solid electrolyte including an electron-conductive polymer. However, the solid electrolyte is not limited thereto and any other suitable solid electrolytes may be used. For example, the solid electrolyte may include the solid ion conductor compound represented by Formula 1.

The ion-conductive inorganic material may include, but is not limited to, at least one of a glassy or amorphous metal ion conductor, a ceramic active metal ion conductor, a glass-ceramic active metal ion conductor, or any other suitable ion-conductive inorganic material. For example, the ion-conductive inorganic material may be, for example, in the form of ion-conductive inorganic particles or a sheet-shaped molded product thereof.

For example, the ion-conductive inorganic material includes at least one of $BaTiO_3$, $Pb(Zr_aTi_{1-a})O_3$ $0 \le a \le 1$ (PZT), $Pb_{1-x}La_xZr_{1-y}Ti_yO_3$ (PLZT, where $0 \le x < 1$ and $0 \le y < 1$), $Pb(Mg_{1/3}Nb_{2/3})O_3$—$PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0 \le x \le 1$, $0 \le y \le 1$, $0 \le a \le 1$, $0 \le b \le 1$), lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$), lithium nitride ($Li_xN_y$, where $0<x<4$, $0<y<2$), $SiS_2$($Li_xSi_yS_z$) type glass (where $0<x<3$, $0<y<2$, and $0<z<4$), $P_2S_5$($Li_xP_yS_z$) type glass (where $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, Garnet-based ceramics ($Li_{3+x}La_3M_2O_{12}$ (where M=Te, Nb, Zr)), or a combination thereof.

For example, the polymeric ionic liquid (PIL) may include a repeating unit containing i) at least one cation of ammonium, pyrrolidium, pyridinium, pyrimidinium, imidazolium, piperidinium, pyrazolium, oxazolium, pyridazinium, phosphonium, sulfonium, triazole, or a combination thereof, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$. For example, the polymeric ionic liquid may be poly(diallyldimethylammonium) (TFSI), poly(1-allyl-3-methylimidazolium trifluoromethanesulfonylimide), or poly((N-Methyl-N-propylpiperidinium bis(trifluoromethanesulfonyl)imide)).

For example, the ionically conducting polymer includes at least one ion-conductive repeating unit derived from an ether, acrylic, methacrylic, or siloxane monomers.

Examples of the ionically conducting polymer include, but are not limited to, polyethyleneoxide (PEO), polyvinylalcohol (PVA), polyvinylpyrrolidone (PVP), polyvinylsulfone, polypropyleneoxide (PPO), polymethylmethacrylate, polyethylmethacrylate, polydimethylsiloxane, polyacrylic acid, polymethacrylic acid, polymethyl acrylate, polymethyl acrylate, poly2-ethylhexyl acrylate, polybutyl methacrylate, poly(2-ethylhexylmethacrylate), polydecyl acrylate, polyethylenevinylacetate, phosphate ester polymer, polyester sulfide, polyvinylidene fluoride (PVdF), Li-substituted Nafion, or any other suitable ion conducting polymers.

Examples of the electron-conductive polymer include, but are not limited to, polyphenylene derivatives or polythiophene derivatives, or any other suitable electron-conductive polymers.

The gel electrolyte is obtained by adding a low-molecular weight solvent to the solid electrolyte interposed between the positive electrode and the negative electrode. For example, the gel electrolyte is a gel electrolyte obtained by adding a low-molecular weight compound, such as a solvent and an oligomer, to a polymer. For example, the gel electrolyte is prepared by adding a low-molecular weight compound, such as a solvent and an oligomer, to a polymer electrolyte.

The liquid electrolyte includes a solvent and a lithium salt.

The solvent may include at least one of an organic solvent, an ionic liquid, or an oligomer. However, the solvent is not limited thereto and any other solvents in a liquid state at room temperature (25° C.) may be used.

For example, the organic solvent comprises an ether-based solvent, a carbonate-based solvent, an ester-based solvent, a ketone-based solvent, or a combination thereof. Examples of the organic solvent include, but are not limited to, propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyl dioxorane, dimethyl acetamide, dimethylsulfoxide, dioxane, 1,2-dimethoxy ethane, sulforane, dichloloethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Mn=~500), dimethyl ether, diethyl ether, dibutyl ether, dimethoxy ethane, 2-methyltetrahydrofuran, and tetrahydrofuran, or other organic solvents in a liquid state at room temperature.

For example, the ionic liquid (IL) may include i) a cation, e.g., ammonium, pyrolidium, pyridinium, pyrimidium, imidazolium, piperidinium, pyrazolium, oxazolium, pyridazinium, phosphonium, sulfonium, triazole, or a combination thereof, and ii) an anion, e.g., $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, $(CF_3SO_2)_2N^-$, or a combination thereof.

The lithium salt may comprise lithium bis(trifluoromethanesulfonyl)imide (LiTFSI), $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$ or lithium trifluoromethanesulfonate (LiTfO), or a combination thereof, but is not limited thereto, and any suitable lithium salts may be used. For example, a concentration of the lithium salt is in the range of about 0.01 M to about 5.0 M.

For example, the lithium air battery further include the separator between the positive electrode and the negative electrode. The separator may have any suitable composition for a lithium air battery. Examples of the separator include a non-woven fabric of a polymer such as a polypropylene non-woven fabric or a polyphenylene sulfide non-woven fabric, a porous film of an olefin resin such as polyethylene or polypropylene, glass fibers, or a combination thereof.

For example, the electrolyte layer has a structure in which the separator is impregnated with a solid polymer electrolyte or the separator is impregnated with a liquid electrolyte. The electrolyte layer in which the separator is impregnated with the solid polymer electrolyte is prepared by, for example, locating a solid polymer electrolyte film on one surface or opposite surfaces of the separator and simultaneously rolling the solid polymer electrolyte film and the separator. The electrolyte layer in which the separator is impregnated with the liquid electrolyte is prepared by injecting the liquid electrolyte including a lithium salt into the separator.

The lithium air battery is prepared by locating a negative electrode on a surface of a case, locating an electrolyte layer on the negative electrode, locating a positive electrode on the electrolyte layer, locating a porous positive current collector on the positive electrode, locating a pressing member that allows air to reach to the air electrode on the porous positive current collector, and pressing the stacked structure to fix a cell. The case may be divided into an upper portion in contact with the negative electrode and a lower portion in contact with the air electrode, an insulating resin may be interposed between the upper and lower portions to electrically insulate the positive electrode from the negative electrode.

The lithium air battery may be used as either a primary battery or a secondary battery. The lithium air battery may be in the form of a coin, a button, a sheet, a stack, a cylinder, a plane, or a horn, but the shape of the lithium-air battery is not particularly limited thereto. The lithium air battery may also be applied to medium or large-sized batteries for electric vehicles.

Figure 4D:
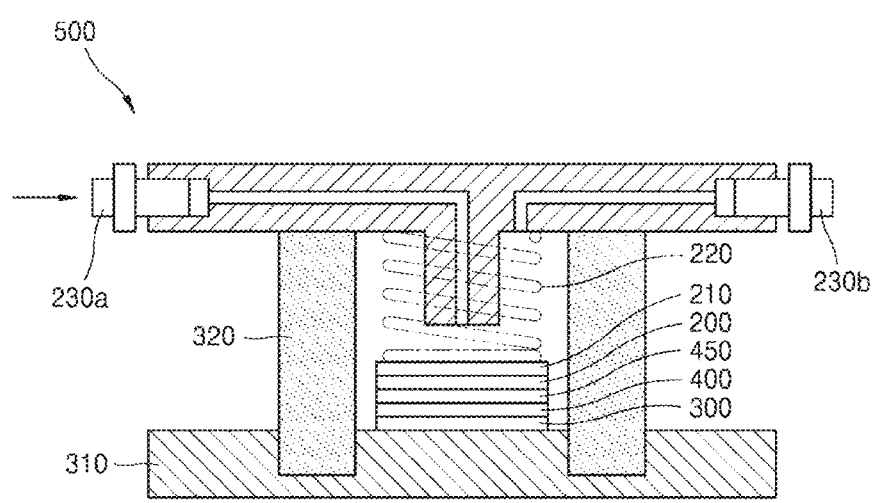
FIG. 4D is a schematic diagram of a lithium air battery according to an embodiment.

An example of the lithium air battery is schematically illustrated in FIG. 4D. A lithium air battery 500 includes a positive electrode 200 adjacent to a positive current collector 210 and using oxygen as an active material, a negative electrode 300 adjacent to a negative current collector 310 and including lithium, and a first electrolyte layer 400 interposed therebetween. The first electrolyte layer 400 is a separator impregnated with a liquid electrolyte. A second electrolyte layer 450 is located between the positive electrode 200 and the first electrolyte layer 400. The second electrolyte layer 450 is Li ion-conductive solid electrolyte film. The positive current collector 210 that is porous may also serve as a gas diffusion layer allowing diffusion of air. A pressing member 220 allowing air to reach the positive electrode 200 is located on the positive current collector 210. A case 320 formed of an insulating resin is interposed between the positive electrode 200 and the negative electrode 300 to electrically insulate the positive electrode 200 from the negative electrode 300. Air is supplied through an air inlet 230a and discharged through an air outlet 230b. The lithium-air battery 500 may be accommodated in a stainless steel case.

The term "air" of the lithium air battery is not limited to atmospheric air and may also refer to a combination of gases including oxygen or pure oxygen gas. This broad definition of "air" may also be applied to all applications, such as air batteries and air electrodes.

A method of preparing a solid ion conductor compound according to an embodiment includes: contacting a lithium compound; a tetravalent cationic element-containing compound; and at least one of a pentavalent cationic element-containing compound and a hexavalent cationic element-containing compound with each other to provide a mixture; and performing first heat-treatment on the mixture in an oxidizing atmosphere to provide a solid ion conductor compound. The solid ion conductor compound may be, for example, the solid ion conductor compound represented by Formula 1.

The lithium compound may include an oxide, a nitride, an oxynitride, a nitrate, a hydroxide, or a carbonate each including lithium. For example, lithium carbonate or lithium nitrate may be used.

The tetravalent cationic element-containing compound includes an oxide, a nitride, an oxynitride, a nitrate, a hydroxide, or a carbonate each including a tetravalent cation, e.g., Hf. A zirconium oxide, a hafnium oxide, or a combination thereof may be used.

The pentavalent cationic element-containing compound includes an oxide, a nitride, an oxynitride, a nitrate, a hydroxide, and a carbonate each including a pentavalent cation, e.g., a Group 5 element, a Group 15 element, or a combination thereof. $Ta(OC_2H_5)_2$, a niobium oxide, a vanadium oxide, an antimony oxide, an arsenic oxide, or a combination thereof may be used.

The hexavalent cationic element-containing compound includes an oxide, a nitride, an oxynitride, a nitrate, a hydroxide, or a carbonate each including a hexavalent cation, e.g., a Group 6 element, a Group 16 element, or a combination thereof. A tungsten oxide, a selenium oxide, a tellurium oxide, a molybdenum oxide, or a combination thereof may be used.

The compound may be prepared by bringing starting materials into contact with each other in appropriate amounts, e.g., stoichiometric amounts, to prepare a mixture, and heat-treating the mixture. The contact may include, milling such as ball milling or pulverizing.

A mixture of precursors mixed in a stoichiometric ratio may be subjected to first heat-treatment in an oxidizing atmosphere to prepare a first heat-treatment product. The first heat-treatment may be performed at a temperature below about 1000° C. for about 1 hour to about 36 hours.

The first heat-treatment may be performed at a temperature of, for example, about 500° C. to about 1000° C., about 600° C. to about 950° C., about 700° C. to about 900° C., about 700° C. to about 850° C., or about 700° C. to about 800° C. The first heat-treatment is performed for about 1 hour to about 36 hours, about 2 hours to about 30 hours, about 4 hours to about 24 hours, about 10 hours to about 24 hours, or about 16 hours to about 24 hours.

The method of preparing the solid ion conductor compound may further include: pulverizing and molding the solid ion conductor compound to prepare a molded product; and performing second heat-treatment on the molded product in at least one of an oxidizing atmosphere to prepare a sintered product, after providing the solid ion conductor compound by performing first heat-treatment on the mixture in an oxidizing atmosphere.

The first heat-treatment product may be pulverized. Pulverization of the first heat-treatment product may be performed by a dry pulverization method or a wet pulverization method. The wet pulverization may be performed by mixing the first heat-treatment product with a solvent such as methanol, and milling the mixture using a ball mill, or other suitable means for milling, for about 0.5 hours to about 10 hours. The dry pulverization may be performed by milling the first heat-treatment product using a ball mill without using a solvent. A diameter of the pulverized first heat-treatment product may be in the range of about 0.1 μm to about 10 μm or about 0.1 μm to about 5 μm. The pulverized first heat-treatment product may be dried.

The pulverized first heat-treatment product may be mixed with a binder solution to be molded into pellets or simply pressed at a pressure of about 1 ton to about 10 tons to be molded into pellets.

The molded product may be subjected to second heat-treatment at a temperature below about 1000° C. for about 1 hour to about 36 hours. The sintered product is obtained by the second heat-treatment.

The second heat-treatment may be performed at a temperature of, for example, about 550° C. to about 1000° C., about 650° C. to about 950° C., about 750° C. to about 900° C., or about 800° C. to about 900° C. The second heat-treatment is performed for about 1 hour to about 36 hours, about 4 hours to about 32 hours, about 10 hours to about 30 hours, about 20 hours to about 30 hours, or about 20 hours to about 28 hours.

The second heat-treatment temperature is greater than the first heat-treatment temperature to obtain the sintered product. For example, the second heat-treatment temperature may be greater than the first heat-treatment temperature by about 10° C. or more, about 20° C. or more, about 30° C. or more, or about 50° C. or more.

The pellets may be subjected to second heat-treatment in at least one of an oxidizing atmosphere or a reducing atmosphere.

The second heat-treatment may be performed a) in an oxidizing atmosphere, b) in a reducing atmosphere, or c) in both oxidizing and reducing atmospheres. The atmosphere of the second heat-treatment may be selected based on the oxidation number of the metal included in the solid ion conductor.

The oxidizing atmosphere is an atmosphere including an oxidizing gas. Examples of the oxidizing gas include, but are not limited to, oxygen or air, or any other suitable oxidizing gases. The oxidizing atmosphere may be a mixture of an oxidizing gas and an inert gas. The inert gas used herein may be the same as that used in the reducing atmosphere.

The reducing atmosphere is an atmosphere including a reducing gas. Examples of the reducing gas include, but are not limited to, hydrogen ($H_2$), and any other suitable reducing gases may also be used. The reducing atmosphere may be a mixture of a reducing gas and an inert gas. Examples of the inert gas include, but are not limited to, nitrogen or argon, or any other suitable inert gases. The inert gas used herein may be the same as that used in the reducing atmosphere may be, for example, in the range of about 1% to about 99%, about 2% to about 50%, or about 5% to about 20%, based on a total amount of gases. By performing the heat-treatment in a reducing atmosphere, oxygen vacancy is introduced in a mixed conductor.

The second heat-treatment performed in both oxidizing and reducing atmospheres refers to second heat-treatment including heat-treatments sequentially performed in an oxidizing atmosphere and the in a reducing atmosphere. The oxidizing atmosphere and the reducing atmosphere are identical to the above-described oxidizing atmosphere and reducing atmosphere.

Hereinafter, one or more example embodiments of the present disclosure will be described in detail with reference to the following examples and comparative examples. These examples and comparative examples are not intended to limit the purpose and scope of the one or more exemplary embodiments of the present disclosure.

EXAMPLES

Preparation of Solid Ion Conductor Compound

Example 1: Preparation of $Li_{5.875}Hf_{1.875}Ta_{0.125}O_7$ $Li_2CO_3$ as a Li precursor, $HfO_2$ as a hafnium precursor, and $Ta(OC_2H_5)_2$ as a tantalum precursor were mixed in a stoichiometric ratio and pulverized and mixed using a ball mill with zirconia balls (YSZ) having a diameter of 12 mm at 1725 rpm for 2 hours to obtain a mixture. Here, an excess of the Li precursor of $Li_2CO_3$ by 10 wt % more than the stoichiometric ratio was used to allow for lithium loss during heat-treatment. The obtained mixture was subjected to a first heat-treatment at 800° C. in an air atmosphere for 20 hours to form a first heat-treatment product. The first heat-treatment product was pulverized using a ball mill and pressed with a uniaxial pressure to prepare pellets. The prepared pellets were subjected to a second heat-treatment at 850° C. in an air atmosphere for 24 hours to prepare a solid ion conductor compound. The prepared solid ion conductor compound has a composition of $Li_{5.875}Hf_{1.875}Ta_{0.125}O_7$ substituted with a pentavalent cation of Ta.

Example 2: Preparation of $Li_{5.875}Hf_{1.875}Nb_{0.125}O_7$

A solid ion conductor compound was prepared in the same manner as in Example 1, except that the stoichiometric mixing ratio of starting materials was modified to obtain $Li_{5.875}Hf_{1.875}Ta_{0.125}O_7$, and $Nb(OCH_2CH_3)_5$, as a Nb precursor, was used instead of the Ta precursor. A composition substituted with a pentavalent cation of Nb was obtained.

Example 3: Preparation of $Li_{5.75}Hf_{1.875}Ta_{0.125}O_{6.875}F_{0.125}$

A solid ion conductor compound was prepared in the same manner as in Example 1, except that the stoichiometric mixing ratio of starting materials was modified to obtain $Li_{5.75}Hf_{1.875}Ta_{0.125}O_{6.875}F_{0.125}$ and LiF, as a F precursor, was further used. A composition substituted with a pentavalent cation of Ta and a monovalent anion of F was obtained.

Example 4: Preparation of $Li_{5.75}Hf_{1.875}Ta_{0.125}O_{6.875}Cl_{0.125}$

A solid ion conductor compound was prepared in the same manner as in Example 1, except that the stoichiometric mixing ratio of starting materials was modified to obtain $Li_{5.75}Hf_{1.875}Ta_{0.125}O_{6.875}Cl_{0.125}$ and LiCl, as a Cl precursor, was further used. A composition substituted with a pentavalent cation of Ta and a monovalent anion of Cl was obtained.

Example 5: Preparation of $Li_{5.75}Hf_{1.875}W_{0.125}O_7$

A solid ion conductor compound was prepared in the same manner as in Example 1, except that the stoichiometric mixing ratio of starting materials was modified to obtain $Li_{5.75}Hf_{1.875}W_{0.125}O_7$ and $WO_3$, as a W precursor, was used instead of the Ta precursor. A composition substituted with a hexavalent cation of W was obtained.

Comparative Example 1: Preparation of $Li_6Hf_2O_7$

A solid ion conductor compound was prepared in the same manner as in Example 1, except that the stoichiometric mixing ratio of starting materials was modified to obtain $Li_6Hf_2O_7$ and the Ta precursor was not used.

Comparative Example 2: Preparation of $Li_{6.125}Hf_{1.875}Y_{0.125}O_7$

A solid ion conductor compound was prepared in the same manner as in Example 1, except that the stoichiometric mixing ratio of starting materials was modified to obtain $Li_{6.125}Hf_{1.875}Y_{0.125}O_7$ and $Y_2O_3$, as a Y precursor, was used as the Ta precursor. A composition substituted with a trivalent cation of Y was obtained.

Comparative Example 3: Preparation of $Li_{6.125}Hf_{1.875}Sc_{0.125}O_7$

A solid ion conductor compound was prepared in the same manner as in Example 1, except that the stoichiometric mixing ratio of starting materials was modified to obtain $Li_{6.125}Hf_{1.875}Sc_{0.125}O_7$ and $Sc(NO_3)_3$-$xH_2O$, as a Sc precursor, was used as the Ta precursor. A composition substituted with a trivalent cation of Sc was obtained.

Evaluation Example 1: X-Ray Diffraction (XRD) Analysis

Figure 5:
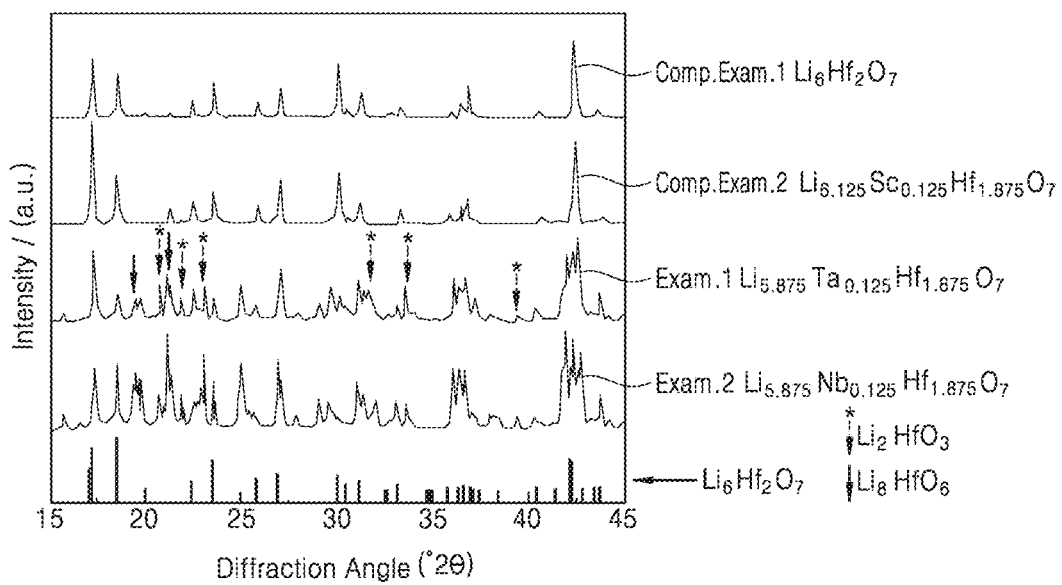
FIG. 5 is a graph of intensity (arbitrary units) versus diffraction angle (°2θ) that shows the results of powder X-ray diffraction (XRD) analysis, using Cu Kα radiation of the solid ion conductor compounds prepared according to Example 1, Example 2, Comparative Example 1, and Comparative Example 3, and calculated peaks for Example 1, Example 2, Comparative Example 1, and Comparative Example 3.

Powder XRD spectra of the solid ion conductor compounds prepared according to Examples 1, Example 2, Comparative Example 1 and Comparative Example 3 were obtained and the results are shown in FIG. 5 together with patterns calculated with respect to $Li_6Hf_2O_7$(ICDD 04-009-5022). The XRD spectra were obtained using Cu Kα radiation.

As shown in FIG. 5, it was confirmed that the solid ion conductor compounds according to Example 1, Example 2, Comparative Example 1, and Comparative Example 3 had a $Li_6Hf_2O_7$ crystal structure, respectively.

It was confirmed that the solid ion conductor compounds according to Examples 1 and 2 had a monoclinic crystal structure belonging to the C2/c space group and a rock-salt-type oxide having a rock-salt-type crystal structure. Also, it was confirmed that a unit cell of a rock-salt-type crystal structure of each of the solid ion conductor compounds according to Examples 1 and 2 had an ordered oxygen deficiency, and the lithium atoms were each coordinated by 5 oxygen atoms in a square pyramid form and at least one atom of Hf and M was coordinated by 6 oxygen atoms in an octahedral form in the unit cell of the rock-salt-type crystal structure.

As shown in FIG. 5, it was confirmed that the solid ion conductor compounds according to Examples 1 and 2 further had an additional phase such as $Li_2HfO_3$ and $Li_6HfO_7$.

Evaluation Example 2: Measurement of Ion Conductivity

A gold (Au) electrode was sputtered on both surfaces of pellets having a thickness of 0.5 mm and an area of 3.14 cm² respectively prepared according to Examples 1 to 5 and Comparative Examples 1 to 3 to deposit a shieling electrode. Samples provided with the electrode at both surfaces were analyzed using an impedance analyzer (Solartron 1400A/1455A impedance analyzer) by a 2-probe method. A frequency of 0.1 Hz to 1 MHz and an amplitude voltage of 10 mV were used. The measurement was performed in an air atmosphere at 25° C. Resistance was calculated from an arc of a Nyquist plot with respect to measurements of impedance, and ion conductivity was calculated by correcting the electrode area and pellet thickness. The results are shown in Table 1.

In addition, ion conductivity with respect to temperature was measured by changing temperature of a chamber in which pellets were contained during the measurement of impedance. An activation energy (Ea) was calculated according to the Arrhenius equation represented by Equation 1 using the slope of the Arrhenius plot that shows changes in ion conductivity with respect to time. The results are shown in Table 1.

$$\sigma = A^{(-Ea/kT)} \quad \text{Equation 1}$$

In Equation 1, $\sigma$ is conductivity, A is frequency factor, Ea is activation energy, k is Boltzmann constant, and T is absolute temperature.

TABLE 1

|  | Activation energy [eV] | Room temperature (25° C.) ion conductivity [mS/cm] |
|---|---|---|
| Example 1 | 0.32 | $1.7 \times 10^{-2}$ |
| Example 2 | 0.41 | $6.2 \times 10^{-3}$ |
| Example 3 | 0.29 | $3.4 \times 10^{-3}$ |
| Example 4 | 0.41 | $9.6 \times 10^{-3}$ |
| Example 5 | — | — |
| Comparative Example 1 | 0.63 | $8.4 \times 10^{-5}$ |
| Comparative Example 2 | — | $2.2 \times 10^{-4}$ |
| Comparative Example 3 | 0.52 | $3.7 \times 10^{-4}$ |

As shown in Table 1, the solid ion conductor compounds according to Examples 1 to 5 had a high ion conductivity of $1 \times 10^{-3}$ mS/cm or more at room temperature.

The solid ion conductor compounds according to Examples 1 to 5 had a low activation energy of 0.5 eV or less at room temperature.

The solid ion conductor compounds according to Examples 1 to 5 had higher ion conductivity than the solid ion conductor compounds according to Comparative Examples 1 to 3.

Evaluation Example 3: Measurement of Electron Conductivity

A gold (Au) electrode was sputtered on both surfaces of pellets having a thickness of 0.5 mm and an area of 3.14 cm² respectively prepared according to Examples 1 to 5 and Comparative Examples 1 to 3 to prepare a symmetric cell. Samples provided with the electrode at both surfaces were analyzed by a DC polarization method to measure electron conductivity. The measurement was performed in an air atmosphere at 25° C.

Time dependent current obtained when a constant voltage of 100 mV is applied to the prepared symmetric cells was measured. Electronic resistance of each solid ion conductor compound was calculated from the measured current and electron conductivity was calculated therefrom. The obtained electron conductivities are shown in Table 2.

TABLE 2

|  | Room temperature (25° C.) electron conductivity [mS/cm] |
|---|---|
| Example 1 | $1.2 \times 10^{-5}$ |
| Example 2 | $1.6 \times 10^{-5}$ |
| Example 3 | $2.1 \times 10^{-6}$ |
| Example 4 | $4.6 \times 10^{-6}$ |
| Example 5 | — |
| Comparative Example 1 | — |
| Comparative Example 2 | — |
| Comparative Example 3 | — |

As shown in Table 2, the solid ion conductor compounds according to Examples 1 to 5 had a low electron conductivity of $2 \times 10^{-5}$ mS/cm or less at room temperature.

Evaluation Example 4: Calculation of Electrochemical Stability

Figure 6:
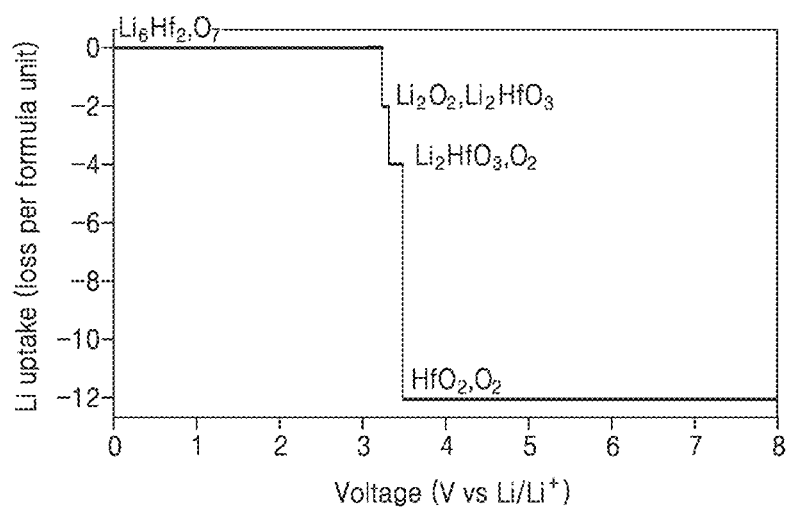
FIG. 6 is a graph of Li uptake (loss per formula unit) versus voltage (V vs. Li/Li$^+$) that illustrates theoretical electrochemical stability of a solid ion conductor compound prepared according to Comparative Example 1 against lithium metal.

Electrochemical stability of each of the solid ion conductor compound of $Li_{5.875}Hf_{1.875}Ta_{0.125}O_7$ according to Example 1, the solid ion conductor compound of $Li_6Hf_2O_7$ according to Comparative Example 1, a solid ion conductor compound of $Li_{6.125}Hf_{1.875}Y_{0.125}O_7$ according Comparative Example 2, and the solid ion conductor compound of $Li_7La_3Zr_2O_{12}$ (LLZO), against lithium metal, and reactivity thereof was calculated. Calculation results of the solid ion conductor compound of $Li_6Hf_2O_7$ according to Comparative Example 1 are shown in FIG. 6.

An intrinsic stability window with respect to Li metal was calculated by the Vienna Ab initio simulation package (VASP) based on a framework of density functional theory (DFT).

The solid ion conductor compound of $Li_{6.75}La_3Hf_2O_{11.75}F_{0.25}$ according to Example 1 exhibited an intrinsic stability window against lithium metal at a voltage of 0.5 V to 3.3 V.

The solid ion conductor compound of $Li_6Hf_2O_7$ according to Comparative Example 1 exhibited an intrinsic stability window against lithium metal at a voltage of 0.0 V to 3.4 V.

The solid ion conductor compound of $Li_{6.125}Hf_{1.875}Y_{0.125}O_7$ according to Comparative Example 2 exhibited an intrinsic stability window against lithium metal at a voltage of 0.0 V to 2.9 V.

The solid ion conductor compound of $Li_7La_3Zr_2O_{12}$ (LLZO) exhibited an intrinsic stability window against lithium metal at a voltage of 0.1 V to 3.1 V.

The solid ion conductor compound of Example 1 showed stability against lithium metal up to a higher oxidation potential that the solid ion conductor compound according to Comparative Example 2 and the solid ion conductor compound of $Li_7La_3Zr_2O_{12}$ (LLZO).

Evaluation Example 5: Evaluation of Electrochemical Stability

The pellets of the solid ion conductor compound of $Li_{5.875}Hf_{1.875}Ta_{0.125}O_7$ according to Example 1 and the pellets of the solid ion conductor compound of $Li_7La_3Zr_2O_{12}$ (LLZO) ( ) were placed on a lithium metal foil and stabilities therebetween were compared at 300° C. after 5 hours.

Figure 7A:
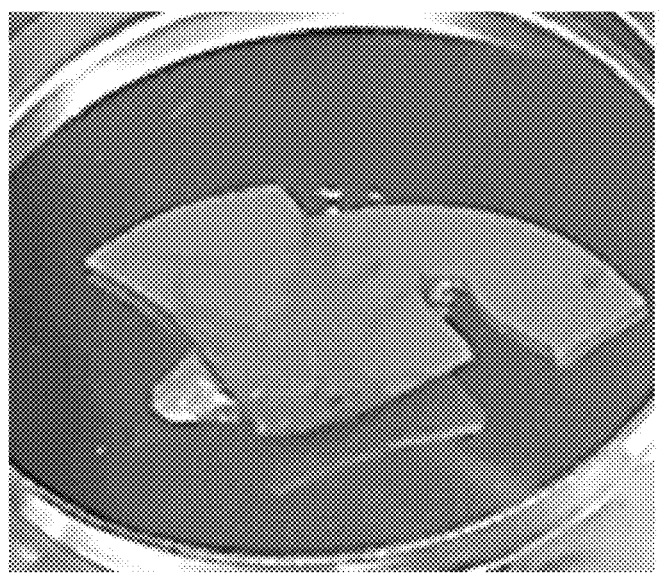
FIG. 7A is an image of a pellet of a solid ion conductor compound of $Li_7La_3Zr_2O_{12}$ (LLZO) after being maintained on a Li foil for a predetermined time.
Figure 7B:
FIG. 7B is an image of a pellet of a solid ion conductor compound prepared according to Example 1 after being maintained on a Li foil for a predetermined time.

Evaluation Results are Shown in FIGS. 7A and 7B.

As shown in FIG. 7A, the pellets of the solid ion conductor compound of $Li_7La_3Zr_2O_{12}$ (LLZO) cracked and decomposed into pieces as a result of reaction with the lithium metal.

However, as shown in FIG. 7B, the pellets of the solid ion conductor compound of Li$_{5.875}$Hf$_{1.875}$Ta$_{0.125}$O$_7$ according to Example 1 maintained in a stable state, although slight cracks occurred on the surface of the pellets as a result of a reaction with the lithium metal.

Thus, the solid ion conductor compound of Li$_{5.875}$Hf$_{1.875}$Ta$_{0.125}$O$_7$ according to Example 1 exhibited excellent stability against lithium metal.

Evaluation Example 6: Evaluation of Electrochemical Stability

A lithium (Li) metal electrode is located on both surfaces of the pellets having a thickness of 0.5 mm and an area of 3.14 cm$^2$ respectively prepared according to Examples 1, 3, and 4 and Comparative Example 1 to prepare a Li metal/pellet/Li metal symmetric cell.

The symmetric cell was analyzed using an impedance analyzer (Material Mates 7260 impedance analyzer) in an air atmosphere at 25° C. by a 2-probe method to measure impedance of the pellets. A frequency of 0.1 Hz to 1 MHz and an amplitude voltage of 10 mV were used. The measurement was performed in an air atmosphere at 25° C. Resistance was calculated from an arc of a Nyquist plot with respect to measurements of impedance.

After the symmetric cell was left standing for 5 days, resistance was measured in the same manner. Resistance increase represented by Equation 2 were obtained by comparing resistance immediately after preparation of the symmetric cell with resistance after 5 days and are shown in Table 3.

Resistance increase [%]=[resistance after 5 days/ resistance immediately after preparation of symmetric cell]×100%     Equation 2

TABLE 3

|   | Resistance increase [%] |
|---|---|
| Comparative Example 1 | 143 |
| Example 1 | 110 |
| Example 3 | 132 |
| Example 4 | 111 |

As shown in Table 3, the solid ion conductor compounds according to Examples 1, 3, and 4 showed a reduced resistance increase when compared with the solid ion conductor compound according to Comparative Example 1. Thus, it was confirmed that side reactions with lithium metal were reduced.

Evaluation Example 7: XPS Evaluation

Figure 8A:
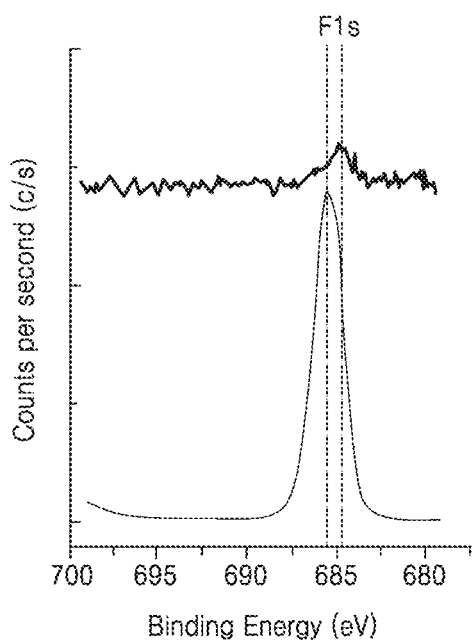
FIG. 8A is a graph of intensity (counts per second (c/s)) versus binding energy (electron volts (eV)) and shows the results of X-ray photoelectron (XPS) analysis of a solid ion conductor compound prepared according to Example 3 and LiF with respect to an F1s orbital.
Figure 8B:
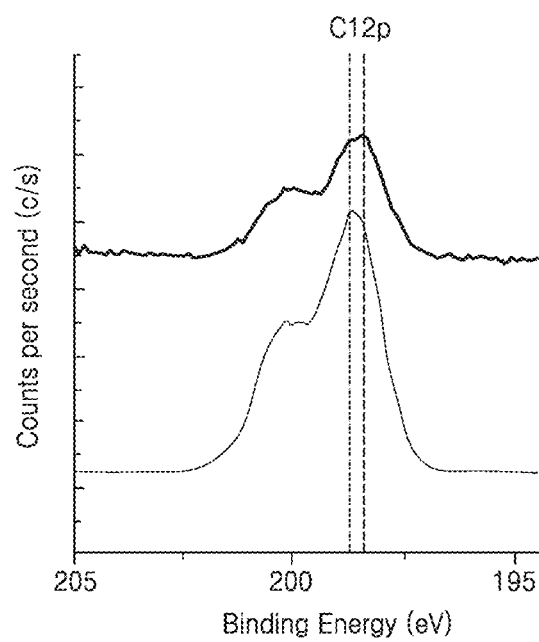
FIG. 8B is a graph of intensity (c/s) versus binding energy (eV) and shows the XPS analysis of a solid ion conductor compound prepared according to Example 4 and LiCl with respect to a Cl2p orbital of LiCl.

The solid ion conductor compound of Li$_{5.75}$Hf$_{1.875}$Ta$_{0.125}$O$_{6.875}$F$_{0.125}$ according to Example 3 and the solid ion conductor compound of Li$_{5.75}$Hf$_{1.875}$Ta$_{0.125}$O$_{6.875}$Cl$_{0.125}$ according to Example 4, LiCl, and LiF were subjected to XPS analysis, and the results are shown in FIGS. 8A and 8B, respectively.

As shown in FIG. 8A, the solid ion conductor compound according to Example 3 and LiF exhibited peaks indicating properties of F1s orbital at around 685 eV. Thus, it was confirmed that the solid ion conductor compound according to Example 3 includes F.

Although the binding energy of the solid ion conductor compound according to Example 3 was less than that of LiF, this is considered to be caused by environmental differences due to the presence of F.

As shown in FIG. 8B, the solid ion conductor compound according to Example 4 and LiCl exhibited peaks indicating properties of Cl2p orbital at about 198 eV. Thus, it was confirmed that the solid ion conductor compound according to Example 4 includes Cl.

Although the binding energy of the solid ion conductor compound according to Example 4 was less than that of LiCl, this is considered to be caused by environmental differences due to the presence of Cl.

Evaluation Example 8: Calculation of Phase Stability

Phase stability of each of the solid ion conductor compounds prepared according to Examples 1 to 5 and Comparative Examples 1 to 3 were evaluated by calculating energy above hull of each solid ion conductor compound. In addition, an additional phase that may be generated by decomposition during a synthesis process thereof was calculated. Calculation results are shown in Table 4 below. The energy above hull was calculated based on a framework of density functional theory (DFT) by the Vienna Ab initio simulation package (VASP).

TABLE 4

|   | Energy above hull [meV/atom] | Decomposition product |
|---|---|---|
| Example 1 | 6.1 | Li$_6$Hf$_2$O$_7$, Li$_2$HfO$_3$, Li$_3$TaO$_4$ |
| Example 2 | 6.8 | Li$_6$Hf$_2$O$_7$, Li$_2$HfO$_3$, Li$_3$NbO$_4$ |
| Comparative Example 1 | 0 | Li$_6$Hf$_2$O$_7$ |
| Comparative Example 2 | 12.4 | Li$_6$Hf$_2$O$_7$, LiYO$_2$, Li$_2$O |
| Comparative Example 3 | 9.3 | Li$_6$Hf$_2$O$_7$, LiScO$_2$, Li$_2$O |

As shown in Table 4, the solid ion conductor compound prepared according to Examples 1 and 2 had a low energy above hull of 6.8 meV/atom or less exhibiting improvement of phase stability and thus may be easily realized.

According to an embodiment, an electrochemical cell having improved lithium ion conductivity and stability against lithium metal may be provided by including the solid ion conductor compound having improved lithium ion conductivity and stability against lithium metal.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor compound represented by Formula 1:

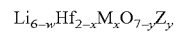     Formula 1 wherein in Formula 1,

M is an element having an oxidation number of a, wherein a is 5, 6, or a combination thereof, Z is an element having an oxidation number of −1, and 0<x<2, 0≤y≤2, and 0<w<6, wherein w=[(a−4)×x]+y.

2. The solid ion conductor compound of claim 1, wherein M is a Group 5 element, a Group 15 element, or a combination thereof.

3. The solid ion conductor compound of claim 1, wherein M is Ta, Nb, V, Sb, As, or a combination thereof.

4. The solid ion conductor compound of claim 1, wherein M is a Group 6 element, a Group 16 element, or a combination thereof.

5. The solid ion conductor compound of claim 1, wherein M is W, Se, Te, Mo, or a combination thereof.

6. The solid ion conductor compound of claim 1, wherein Z is F, Cl, Br, I, or a combination thereof.

7. The solid ion conductor compound of claim 1, wherein 0<x≤0.25, 0≤y≤0.25, and 0<w≤0.75.

8. The solid ion conductor compound of claim 1, wherein in the compound represented by Formula 1, M is Ta, Nb, V, Sb, or As,
Z is F, Cl, Br, I, or a combination thereof, and
0<x≤0.25, 0≤y≤0.25, and 0<w≤0.5.

9. The solid ion conductor compound of claim 1, wherein in the compound represented by Formula 1 M is W, V, Se, Te, or Mo,
Z is F, Cl, Br, I, or a combination thereof, and
0<x≤0.25, 0≤y≤0.25, and 0<w≤0.75.

10. The solid ion conductor compound of claim 1, wherein the solid ion conductor compound represented by Formula 1 has an ion conductivity of about $1\times10^{-3}$ millisiemens per centimeter or more at 27° C.

11. The solid ion conductor compound of claim 1, wherein the solid ion conductor compound represented by Formula 1 has an electron conductivity of about $1\times10^{-5}$ millisiemens per centimeter or less at 27° C.

12. The solid ion conductor compound of claim 1, wherein a mole ratio of the lithium atoms to the oxygen atoms is equal to or less than about 0.9.

13. The solid ion conductor compound of claim 1, wherein the solid ion conductor compound represented by Formula 1 has a monoclinic crystal structure.

14. The solid ion conductor compound of claim 13, wherein the solid ion conductor compound represented by Formula 1 belongs to a C2/c space group.

15. The solid ion conductor compound of claim 1, wherein the solid ion conductor compound represented by Formula 1 has a rock-salt crystal structure, and
a unit cell of the rock-salt-type crystal structure has an ordered oxygen deficiency,
wherein the lithium atoms are each coordinated by 5 oxygen atoms in a square pyramid form, and at least one atom of Hf and M is coordinated by 6 oxygen atoms in an octahedral form in the unit cell of the rock-salt-type crystal structure.

16. The solid ion conductor compound of claim 1, wherein the energy above hull of the solid ion conductor compound represented by Formula 1 is about 25 millielectron volts per atom, or less.

17. A solid electrolyte comprising:
the solid ion conductor compound according claim 1.

18. The solid electrolyte of claim 17, wherein the solid electrolyte further comprises an additional phase.

19. The solid electrolyte of claim 18, wherein the additional phase comprises of $Li_aM_bO_c$ wherein 1.0≤a≤4.0, 0.5≤b≤1.5, 2.0≤c≤5.0, and M is Ta, Nb, V, Sb, As, W, Se, Te, or Mo, $Li_aHf_bO_c$ wherein 5.0≤a≤7.0, 1.5≤b≤2.5, and 6.0≤c≤8.0, $La_dHf_eO_f$ wherein 7.5≤d≤8.5, 0.5≤e≤1.5, and 0.5≤f≤6.5, $La_hHf_iO_j$ wherein 1.5≤h≤2.5, 0.5≤i≤1.5, and 2.5≤j≤3.5, $Li_2O$, LiF, LiCl, LiBr, LiI, or a combination thereof.

20. An electrochemical cell comprising:
a positive electrode,
a negative electrode, and
an electrolyte disposed between the positive electrode and the negative electrode,
wherein at least one of the positive electrode, the negative electrode, or the electrolyte comprises the solid ion conductor compound according to claim 1.

21. The electrochemical cell of claim 20, wherein a protective layer comprising the solid ion conductor compound is disposed on a surface of at least one of the positive electrode, the negative electrode, or the electrolyte.

22. The electrochemical cell of claim 20, wherein the negative electrode comprises lithium metal, a lithium metal alloy, or a combination thereof.

23. The electrochemical cell of claim 20, wherein the negative electrode comprises a negative active material, wherein the negative active material comprises:
a core comprising lithium metal, a lithium metal alloy, or a combination thereof, and
a protective shell disposed on a surface of the core, wherein the protective shell comprises the solid ion conductor compound.

24. The electrochemical cell of claim 20, wherein the electrochemical cell is an all-solid-state lithium battery, a lithium battery including a liquid electrolyte, or a lithium air battery.

25. A method of preparing a solid ion conductor compound, the method comprising:
contacting a lithium compound, a tetravalent cationic element-containing compound, and at least one of a pentavalent cationic element-containing compound and a hexavalent cationic element-containing compound to provide a mixture; and
heat-treating the mixture in an oxidizing atmosphere to provide a solid ion conductor compound of Formula 1, $$Li_{6-w}Hf_{2-x}M_xO_{7-y}Z_y \quad \text{Formula 1}$$

wherein in Formula 1,
M is an element having an oxidation number of a, wherein a is 5, 6, or a combination thereof,
Z is an element having an oxidation number of −1, and 0<x<2, 0≤y≤2, and 0<w<6, wherein w=[(a−4)×x]+y.

26. The method of claim 25, wherein the heat treating of the mixture comprises heat-treating at a temperature less than about 1000° C. for about 1 hour to about 36 hours.

27. The method of claim 25, further comprising:
pulverizing the solid ion conductor compound of Formula 1,
molding the solid ion conductor compound to prepare a molded product; and
heat-treating the molded product in an oxidizing atmosphere to prepare a sintered product.

28. The method of claim 27, wherein heat-treating of the molded product comprises heat-treating for about 1 hour to about 36 hours at a temperature which is less than about 1000° C. and greater than the temperature of the heat-treating of the mixture.

* * * * *